United States Patent
Burton

(10) Patent No.: US 9,938,999 B2
(45) Date of Patent: *Apr. 10, 2018

(54) FASTENER FOR A VEHICLE LAMP ASSEMBLY

(71) Applicant: Burton Technologies, LLC, Ludington, MI (US)

(72) Inventor: John Burton, Ludington, MI (US)

(73) Assignee: Burton Technologies, LLC, Ludington, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/045,782

(22) Filed: Feb. 17, 2016

(65) Prior Publication Data

US 2016/0160896 A1   Jun. 9, 2016

Related U.S. Application Data

(63) Continuation of application No. 13/696,610, filed as application No. PCT/US2011/037760 on May 24, 2011, now Pat. No. 9,382,931.

(60) Provisional application No. 61/347,668, filed on May 24, 2010, provisional application No. 61/379,613, filed on Sep. 2, 2010, provisional application No. 61/452,922, filed on Mar. 15, 2011.

(51) Int. Cl.
| | |
|---|---|
| F16B 21/00 | (2006.01) |
| F16B 5/06 | (2006.01) |
| B60Q 1/26 | (2006.01) |
| F16B 21/07 | (2006.01) |
| F16B 21/16 | (2006.01) |

(52) U.S. Cl.
CPC ............ *F16B 5/0628* (2013.01); *B60Q 1/263* (2013.01); *B60Q 1/2626* (2013.01); *B60Q 1/2649* (2013.01); *F16B 21/075* (2013.01); *F16B 21/078* (2013.01); *F16B 21/16* (2013.01); *Y10T 29/4995* (2015.01)

(58) Field of Classification Search
CPC ... F16B 5/0628; B60Q 1/2642; B60Q 1/2449; B60Q 1/2653
USPC .......................................................... 411/337
See application file for complete search history.

(56) References Cited

U.S. PATENT DOCUMENTS

| | | | | |
|---|---|---|---|---|
| 3,116,528 | A * | 1/1964 | Poe ........................ | A47B 95/02 411/15 |
| 5,073,070 | A | 12/1991 | Chang | |
| 5,129,768 | A | 7/1992 | Hoyle et al. | |
| 5,222,852 | A | 6/1993 | Snyder | |
| 5,269,640 | A | 12/1993 | Jonishi et al. | |
| 5,494,392 | A | 2/1996 | Vogel et al. | |
| 6,039,523 | A * | 3/2000 | Kraus ................... | F16B 5/0628 411/48 |
| 6,264,393 | B1 * | 7/2001 | Kraus ................. | B60R 13/0206 24/297 |

(Continued)

OTHER PUBLICATIONS

International Search Report for PCT/US2011/037760, dated Aug. 31, 2011.

*Primary Examiner* — Gary W Estremsky
(74) *Attorney, Agent, or Firm* — James A. Joyce; Godfrey & Kahn, S.C.

(57) ABSTRACT

A fastener for a vehicle lamp assembly has an adjustable stud and grommet. Positioning grooves on the stud interact with positioning fingers on the grommet in a ratcheting fashion to allow more accurate alignment of the lamp assembly prior to securing the lamp assembly to a vehicle.

6 Claims, 29 Drawing Sheets

(56) References Cited

U.S. PATENT DOCUMENTS

| | | |
|---|---|---|
| 6,672,791 B2 | 1/2004 | Schubring et al. |
| 6,984,096 B2 * | 1/2006 | Kraus ................ B60R 13/0206 411/48 |
| 7,131,806 B2 | 11/2006 | Hansen |
| 7,237,995 B2 | 7/2007 | Perez et al. |
| 7,462,008 B2 | 12/2008 | Attanasio |
| 7,607,875 B2 | 10/2009 | Shinozaki et al. |
| 2009/0155015 A1 | 6/2009 | Parisi et al. |

* cited by examiner

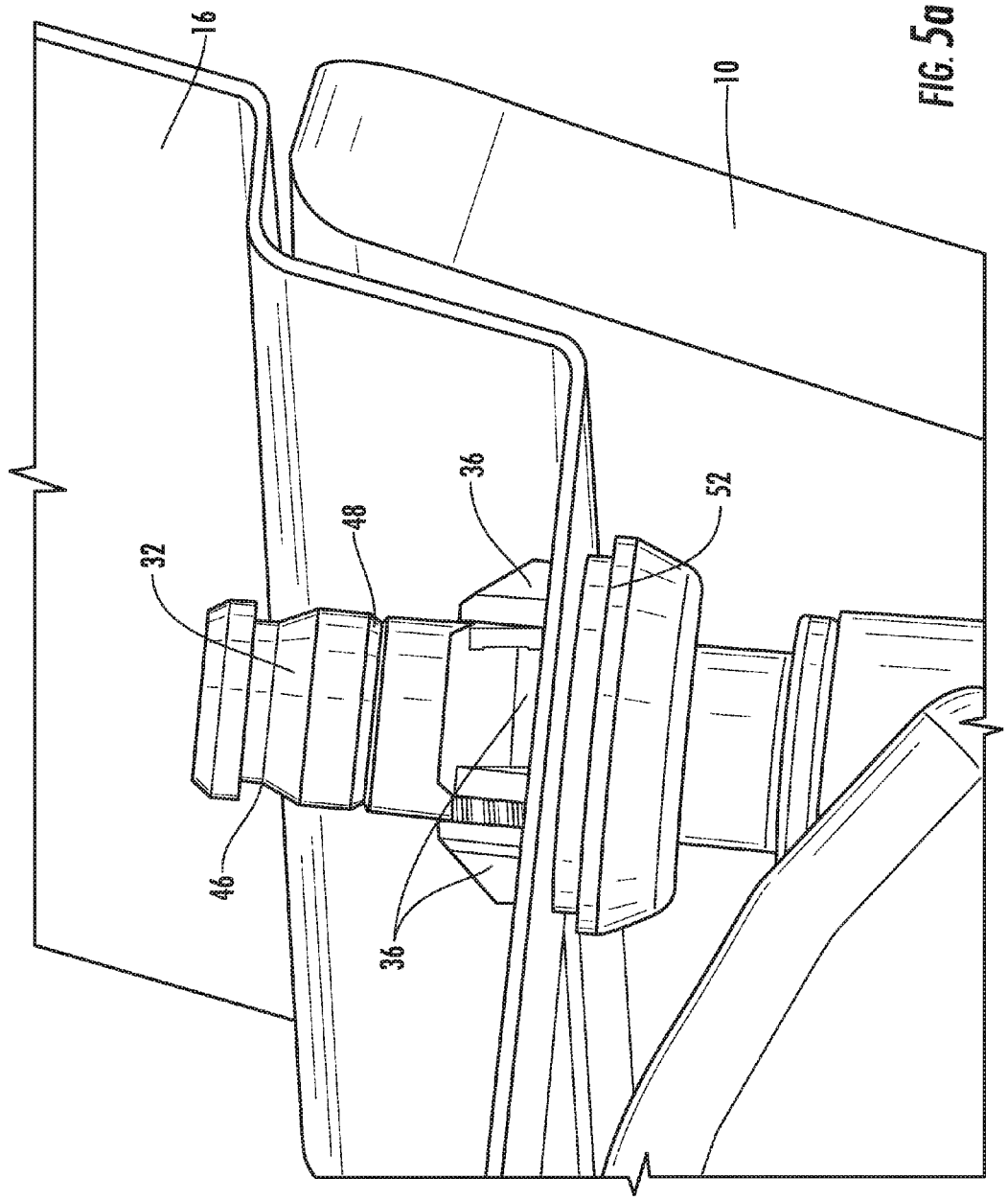

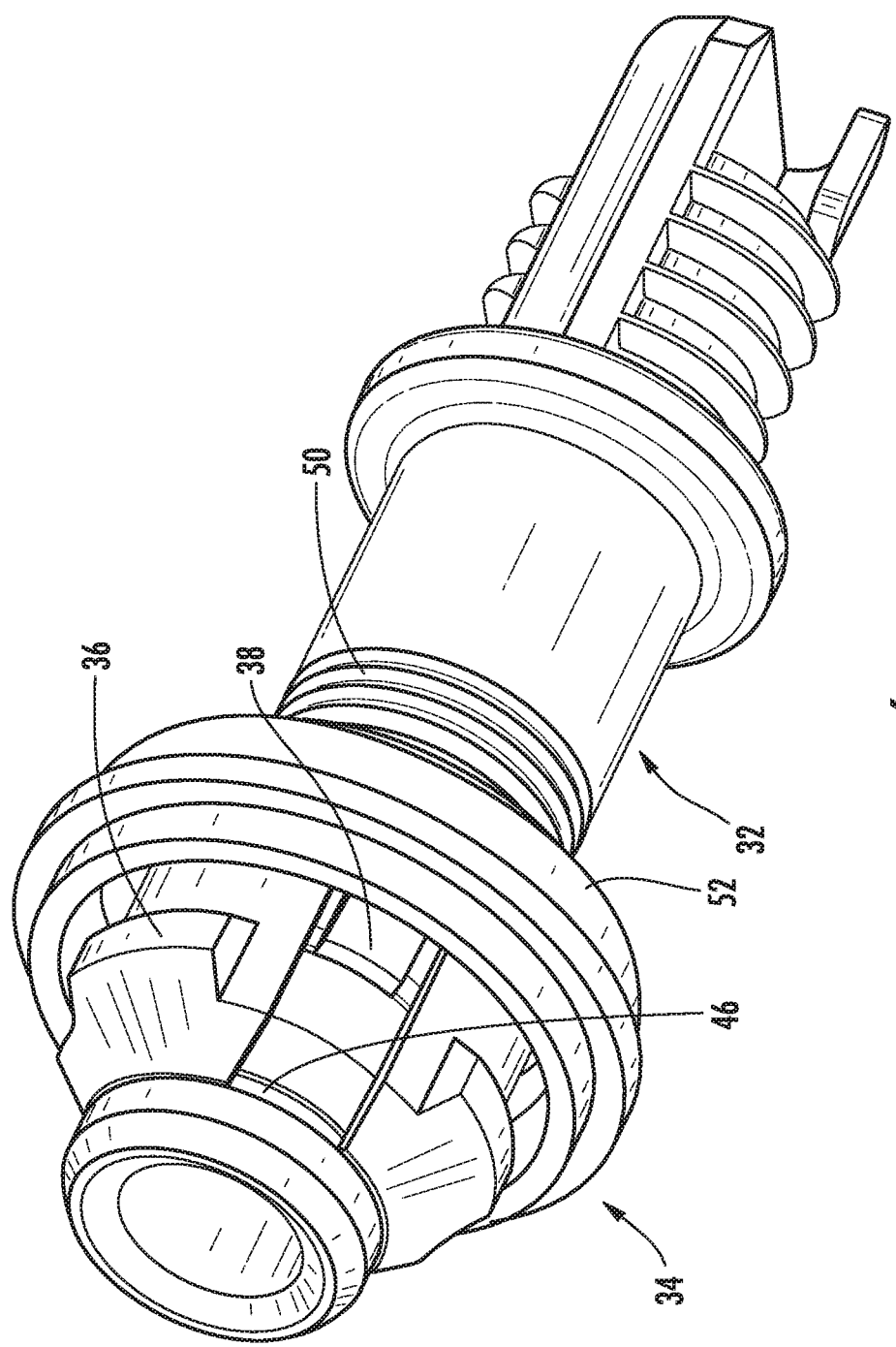

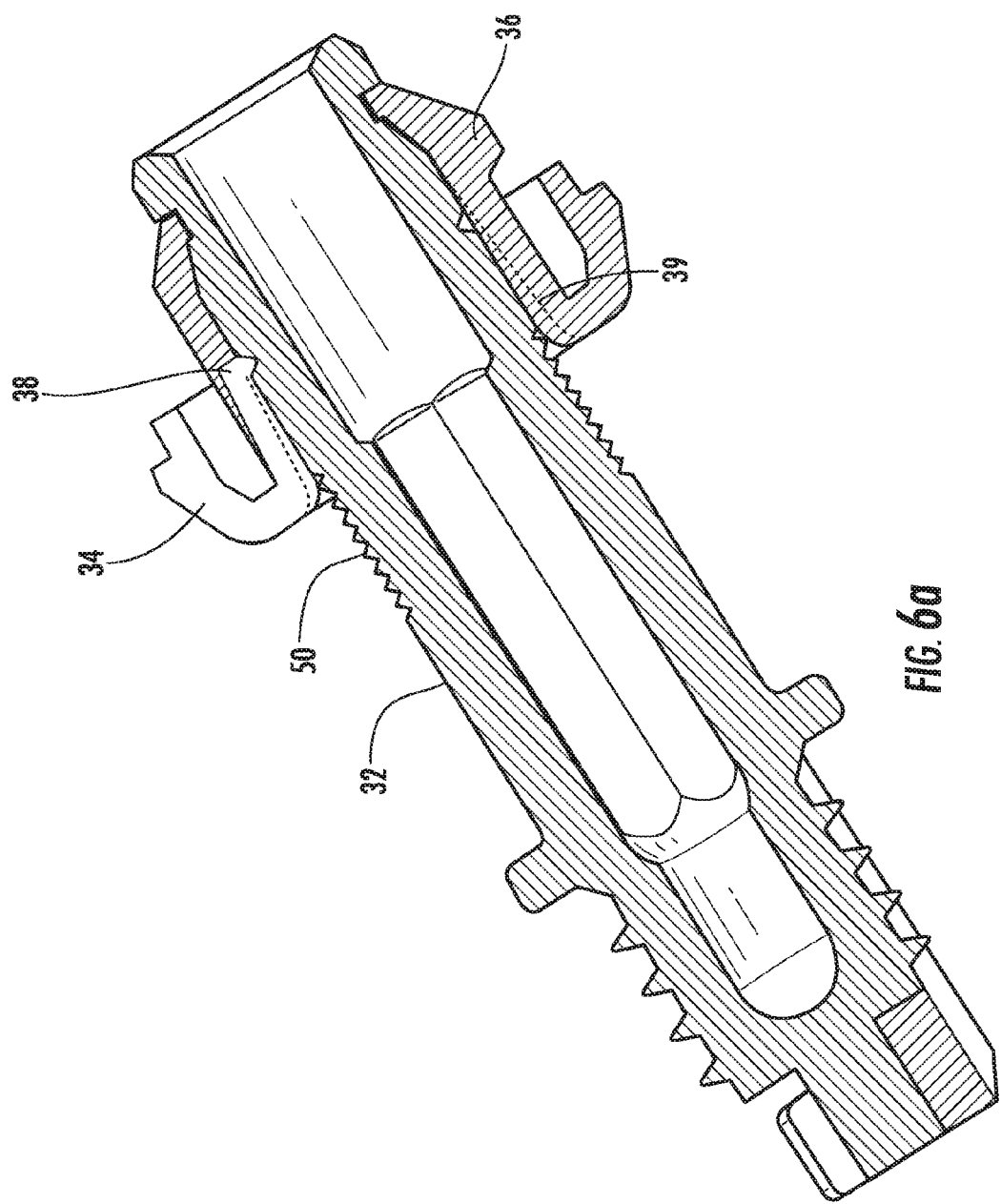

FASTENER FOR A VEHICLE LAMP ASSEMBLY

CROSS-REFERENCE TO RELATED APPLICATIONS

This application is a continuation of U.S. application Ser. No. 13/696,610 filed on Nov. 7, 2012, which claims priority to International Application Number PCT/US11/37760, filed on May 24, 2011, which claims priority from U.S. Provisional Patent Application Ser. No. 61/347,668, filed on May 24, 2010, U.S. Provisional Patent Application Ser. No. 61/379,613, filed on Sep. 2, 2010, and U.S. Provisional Patent Application Ser. No. 61/452,922, filed on Mar. 15, 2011, all of which are incorporated herein by reference for all purposes.

BACKGROUND OF THE INVENTION

The present invention relates generally to fasteners for vehicle lamp assemblies. In particular, the present invention relates to a fastener for a lamp assembly that allows the lamp assembly to be more accurately positioned for mounting on a vehicle.

The present invention is particularly useful in connection with tail lamp assemblies. One common method for installing a tail lamp on a vehicle involves two steps. As shown in FIG. 1, the tail lamp 10 is first held in the position on the vehicle using guide pins or a bulbous stud 12 on the tail lamp 10 that mates with a hole or receiving socket 14 on the vehicle sheet metal 16 or other mounting surface. The bulbous stud and socket effectively act as a detent to secure and fix the position of the outside edge of the tail lamp. Once the outside of the tail lamp 10 is aligned, the inside of the tail lamp 10 is then secured to the vehicle using mounting screws 18.

It is preferable for the stud to socket connection to have some degree of pivoting that allows the tail lamp to hinge somewhat for ease of assembly and removal. It is also preferable for the vehicle assembly plant to receive the tail lamp with the studs and sockets already attached. This way vehicle assembly time is streamlined since the assembler simply needs to push the tail lamp with the sockets attached into the sheet metal holes eliminating the separate step of installing the sockets by themselves. Assembly forces must be controlled between the bulbous stud and socket and between the socket to the sheet metal. Too much assembly force makes installation and removal of the tail lamp difficult and too little force will result in an ineffective means of retention.

As illustrated in FIG. 2, the current method often leaves an uneven or excessive gap 20 between the vehicle sheet metal 16 and the tail lamp 10. A gap 20 of this nature is undesirable in terms of achieving a high quality fit and finish to the vehicle. This undesirable gap 20 is created because the current method does not account for variances in part tolerances and other manufacturing variables. In particular, the current method for aligning the tail lamp 10 does not adequately control the outside edge of the tail lamp 10 in the proper mounting position or allow for fore-aft adjustment of the tail lamp 10 relative to the vehicle sheet metal 16 prior to securing the mounting screws 18.

Accordingly, a need exists for an improved lamp assembly fastener and fastening method that solves these and other deficiencies in the prior art while maintaining efficient and easy assembly to the vehicle. Of course, the present invention may be used in a multitude of situations where similar performance capabilities are required.

SUMMARY OF THE INVENTION

The present invention provides a lamp assembly fastener and fastening method that is cost-effective, easy to assemble, provides improved functionality, and eliminates certain of the deficiencies inherent in existing designs.

One embodiment of the present invention includes a stud adapted for attachment to a lamp assembly and a grommet configured to accept the stud. The stud has a plurality of positioning grooves disposed thereon, and the grommet has at least one retaining finger and at least one positioning finger disposed thereon. The at least one positioning finger interacts with the positioning grooves on the stud as the stud moves relative to the grommet. The retaining finger and groove can be proportioned to control the positioning force to the desired level for both ease of assembly and retention. In one embodiment, the at least one retaining finger retains the grommet on the stud and to the vehicle. In another embodiment, the at least one retaining finger retains the grommet on the vehicle to which the tail lamp is being fastened.

A method for installing a lamp assembly on to a vehicle using the fastener of the present invention is also contemplated. The method comprises the steps of: attaching at least one fastener of the present invention to the lamp assembly; aligning the at least one fastener with a hole in the vehicle sheet metal; passing the fastener through the hole until the grommet is seated in the vehicle sheet metal; pushing the stud through the grommet, wherein the positioning fingers engage the positioning grooves in a ratcheting fashion, until the lamp assembly is properly aligned with the vehicle sheet metal; and securing the lamp assembly to the vehicle sheet metal with at least one mounting screw.

While one possible application of the present invention is in connection with a vehicle lamp assembly such as a tail lamp assembly, many other applications are possible and references to use in connection with a vehicle lamp assembly or tail lamp should not be deemed to limit the uses of the present invention. The terms used herein should not be interpreted as being limited to specific forms, shapes, or compositions. Rather, the parts may have a wide variety of shapes and forms and may be composed of a wide variety of materials.

BRIEF DESCRIPTION OF THE DRAWINGS

FIG. 5a is an enlarged perspective view of a tail lamp and vehicle sheet metal assembly, illustrating one embodiment of the fastener of the present invention wherein the stud has been pushed partially through the grommet;

FIG. 6 is a perspective view of one embodiment of a fastener of the present invention;

FIG. 6a is a section view of the embodiment shown in FIG. 6;

DETAILED DESCRIPTION OF THE PREFERRED EMBODIMENTS

Figure 1:
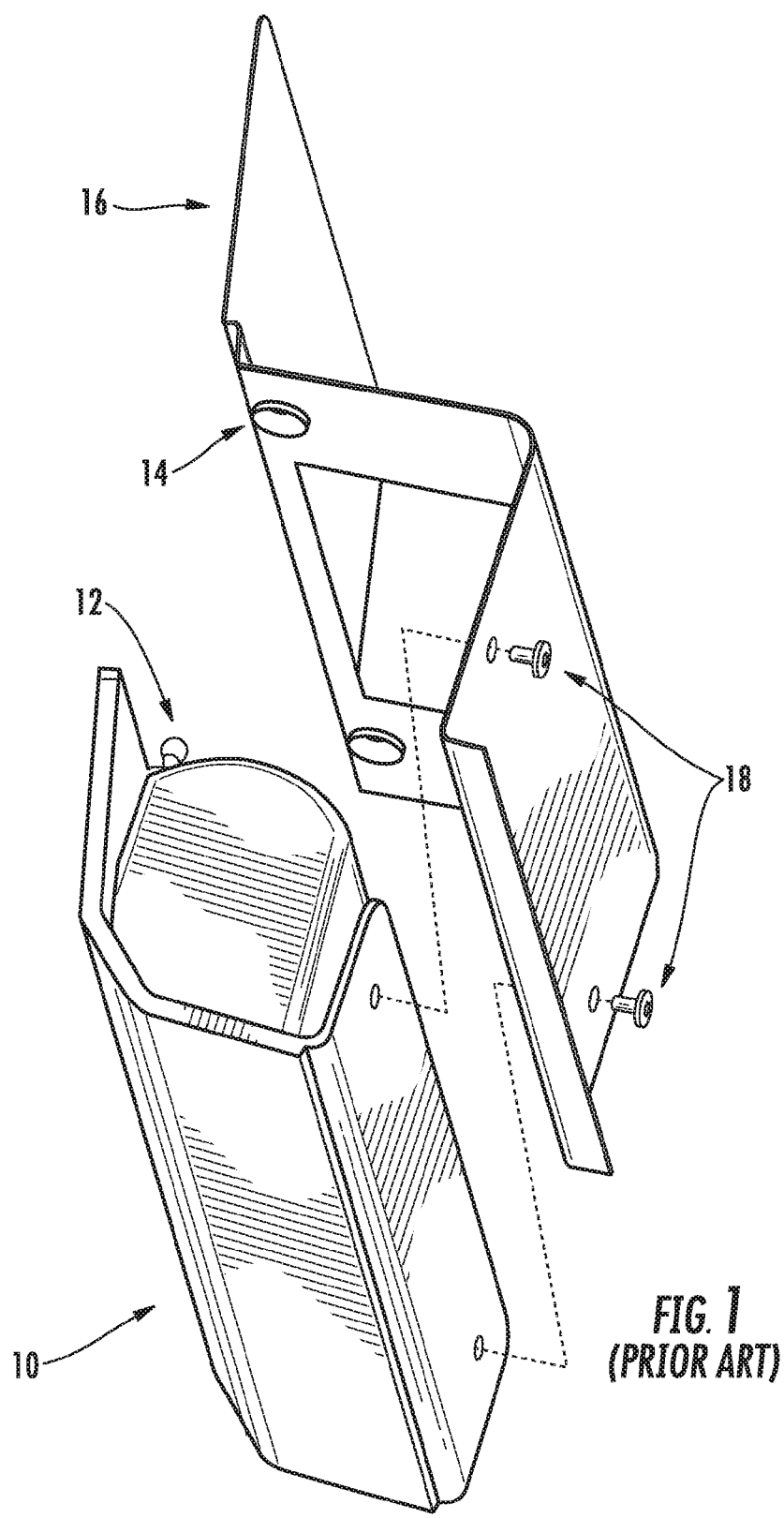
FIG. 1 is an exploded perspective view of a tail lamp and vehicle sheet metal assembly, illustrating a prior art method of fastening the tail lamp to the vehicle sheet metal.
Figure 2:
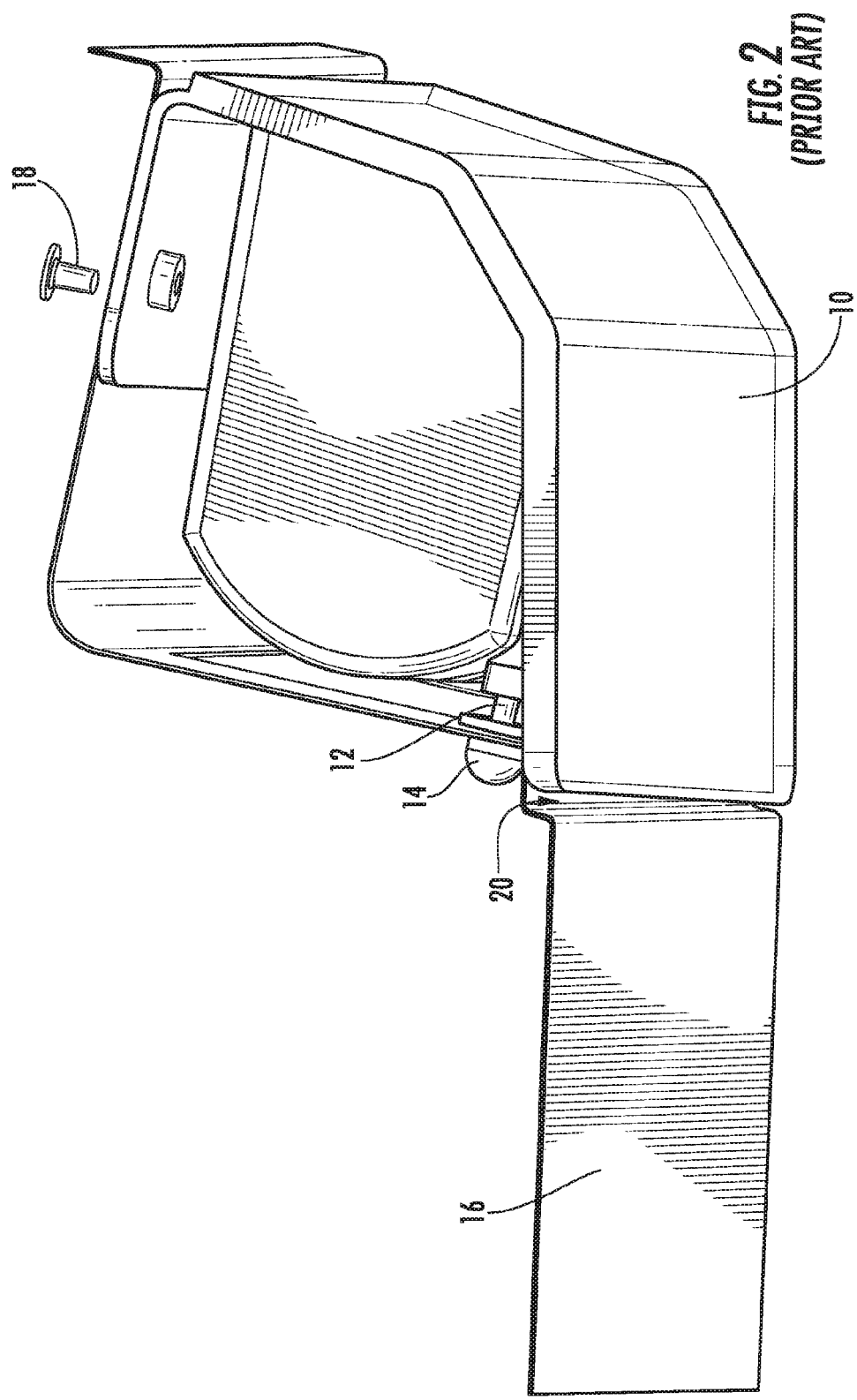
FIG. 2 is a perspective view of a tail lamp and vehicle sheet metal assembly using prior art fastening methods, illustrating the gap problem associated with the use of prior art fastening methods.
Figure 3:
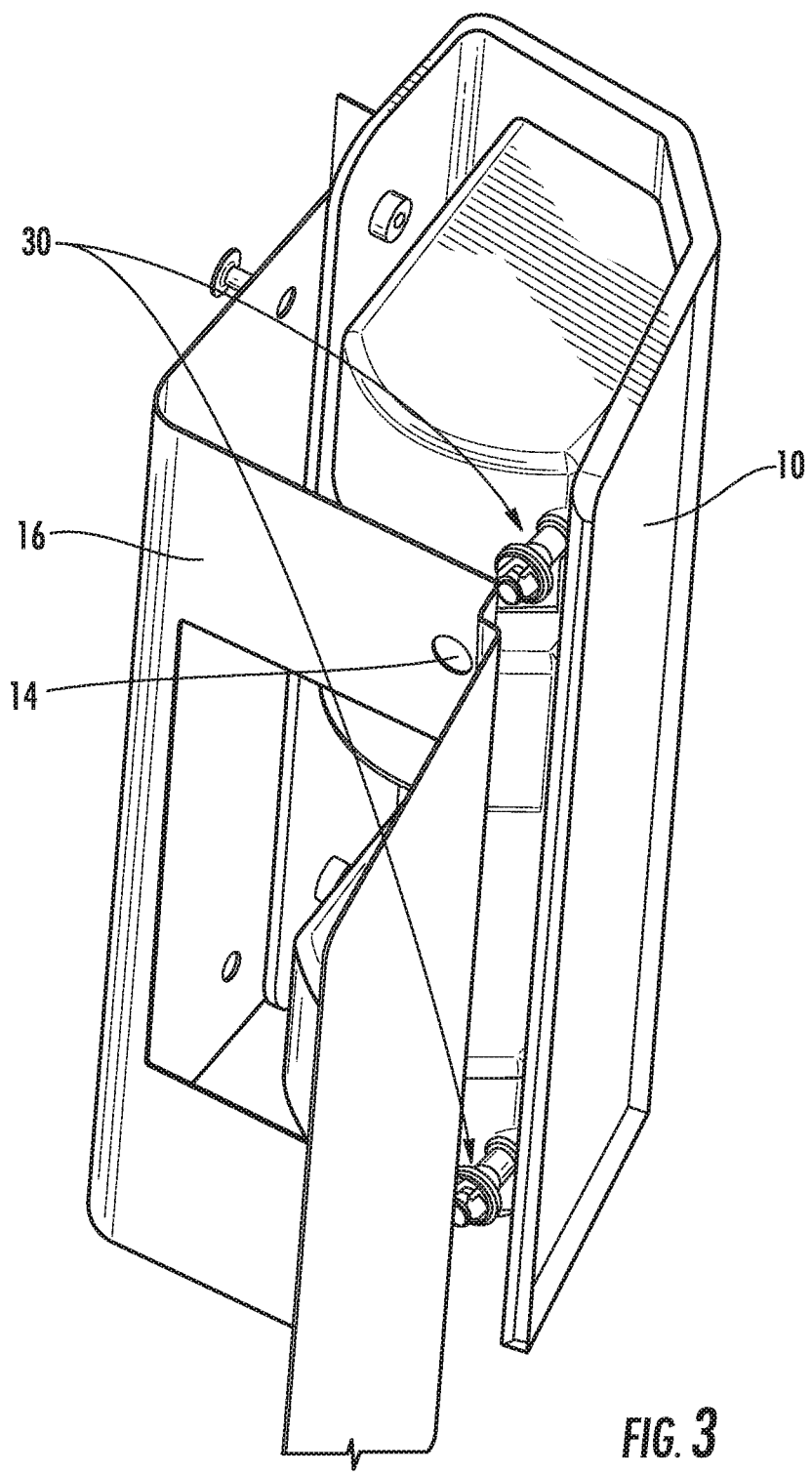
FIG. 3 is a perspective view of a tail lamp and vehicle sheet metal assembly, illustrating one embodiment of the fastener of the present invention.
Figure 4:
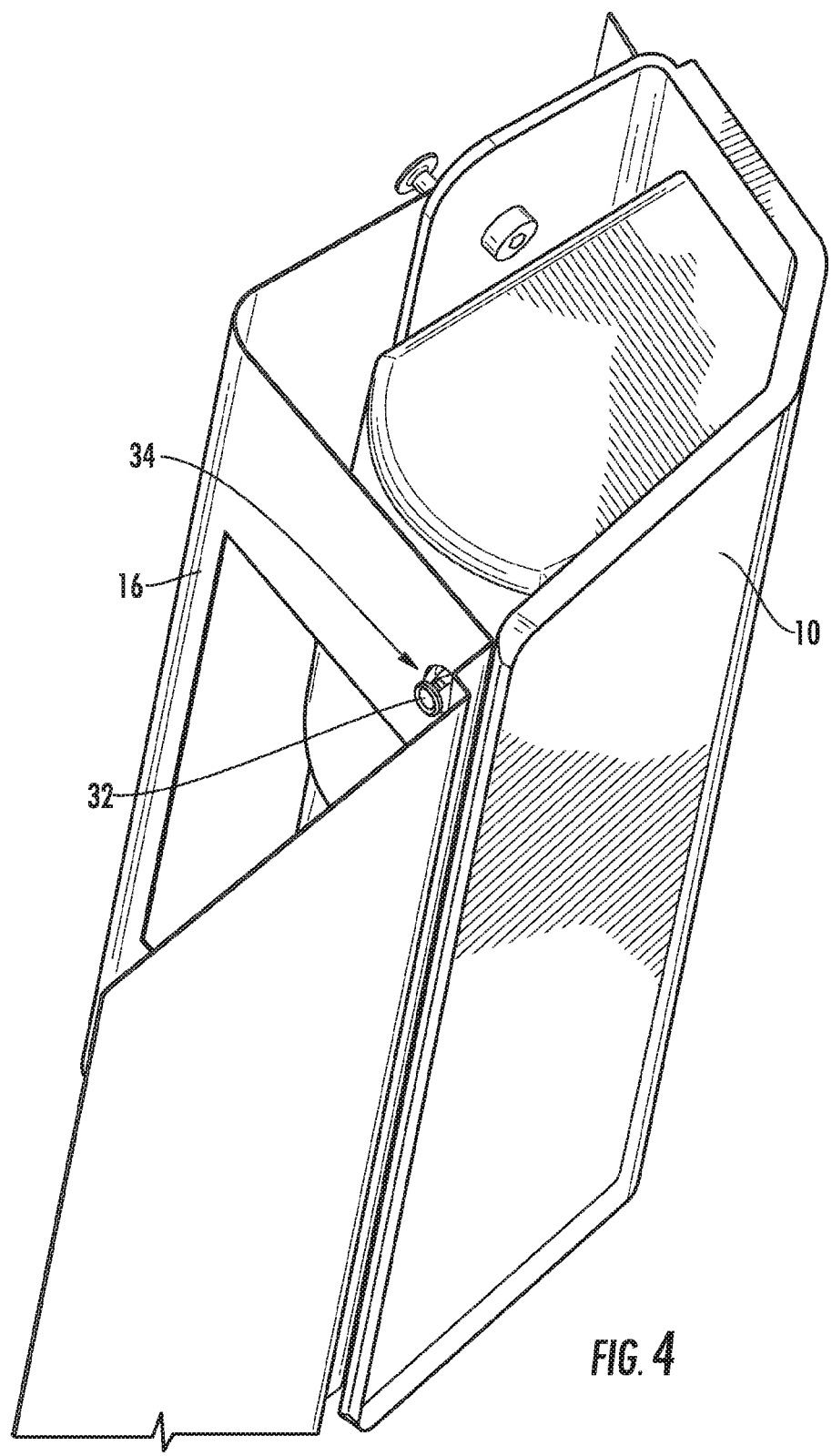
FIG. 4 a perspective view of a tail lamp and vehicle sheet metal assembly, illustrating one embodiment of the fastener of the present invention.
Figure 5:
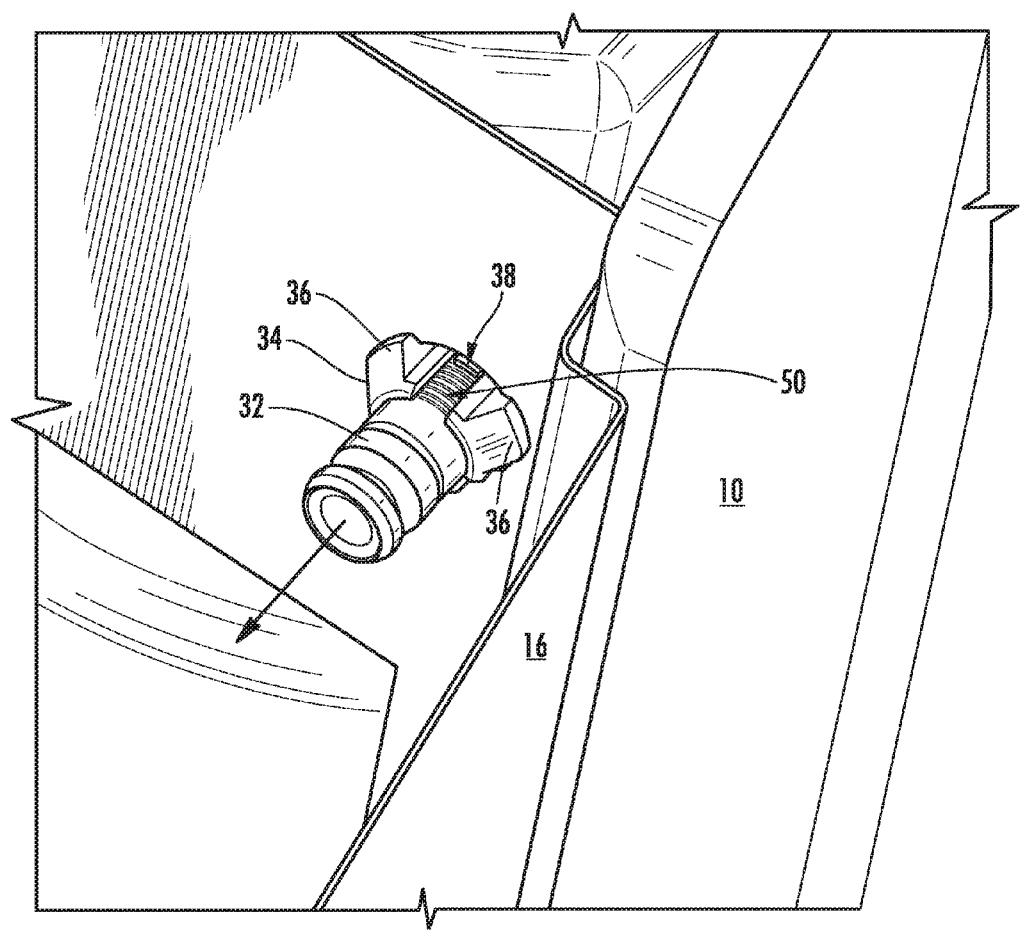
FIG. 5 is an enlarged perspective view of a tail lamp and vehicle sheet metal assembly, illustrating one embodiment of the fastener of the present invention.

FIGS. 3-27 illustrate several embodiments of the present invention. In FIGS. 3-5, a pair of tail lamp fasteners 30 according to one embodiment of the present invention are shown on the tail lamp 10, each interacting with a hole 14 in the vehicle sheet metal 16, in place of the guide pins or bulbous stud 12 of the prior art.

Figure 7:
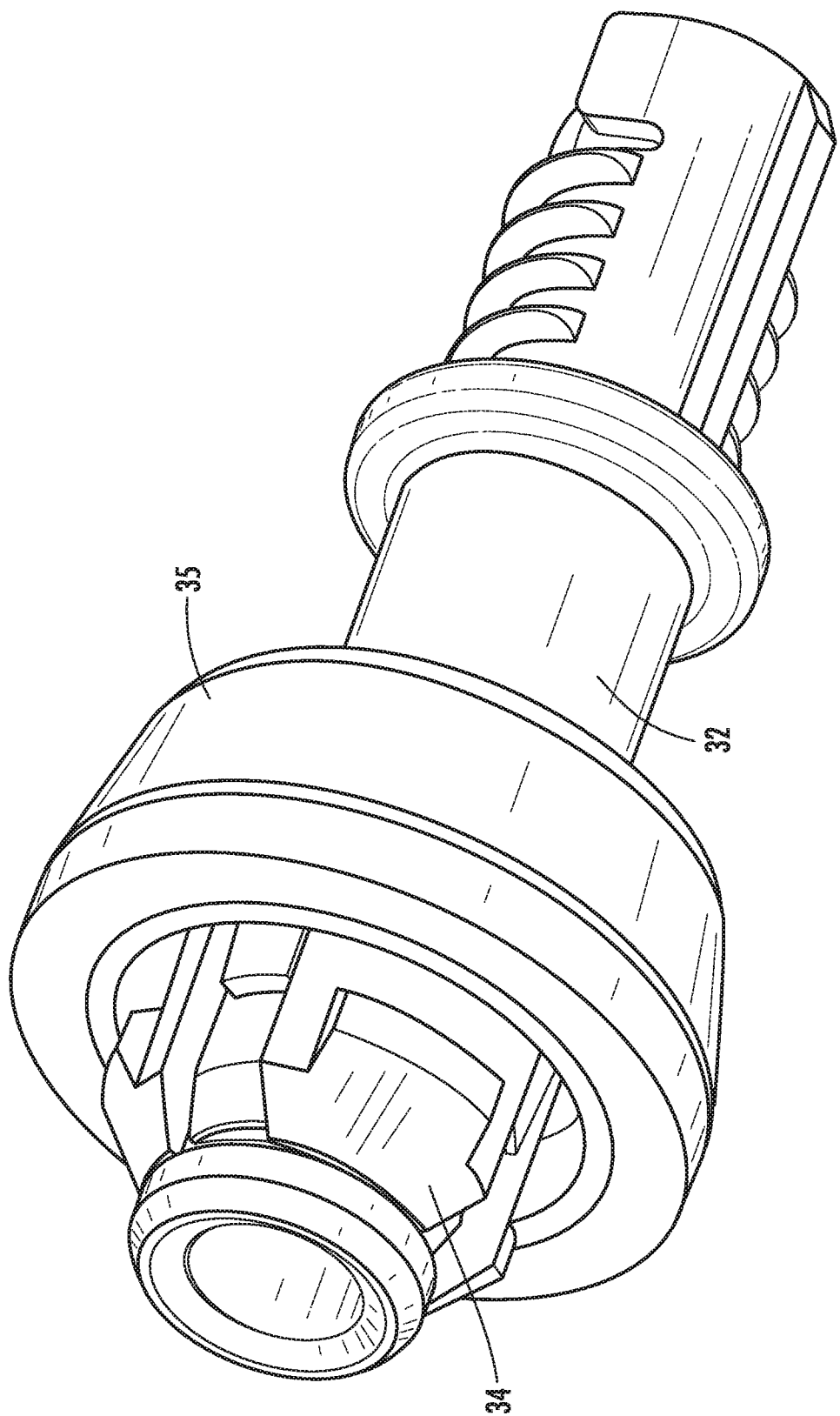
FIG. 7 is a perspective view of one embodiment of a fastener of the present invention, illustrating the use of an optional rubber seal.
Figure 8:
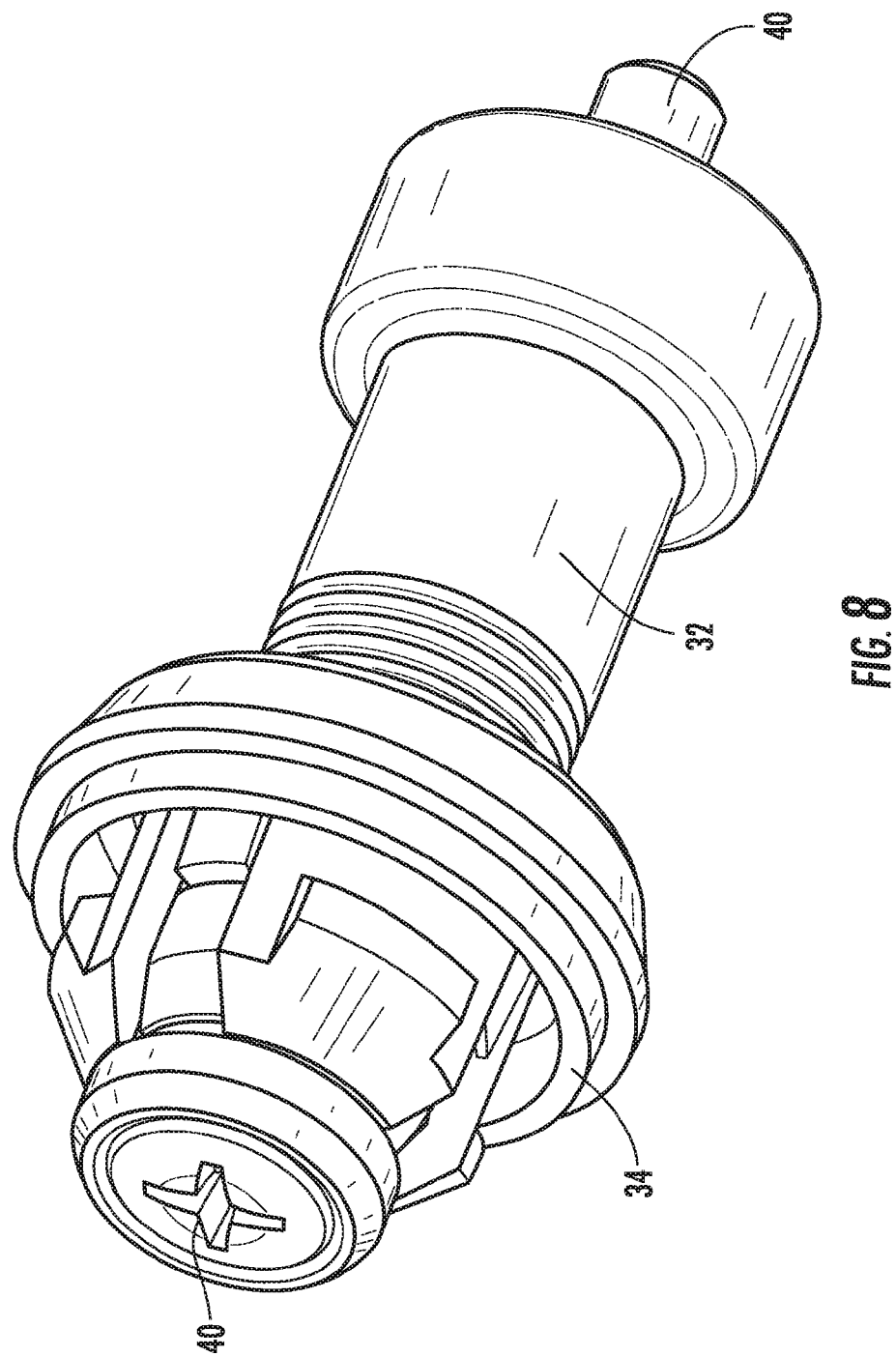
FIG. 8 is a perspective view of one embodiment of a fastener of the present invention.
Figure 9:
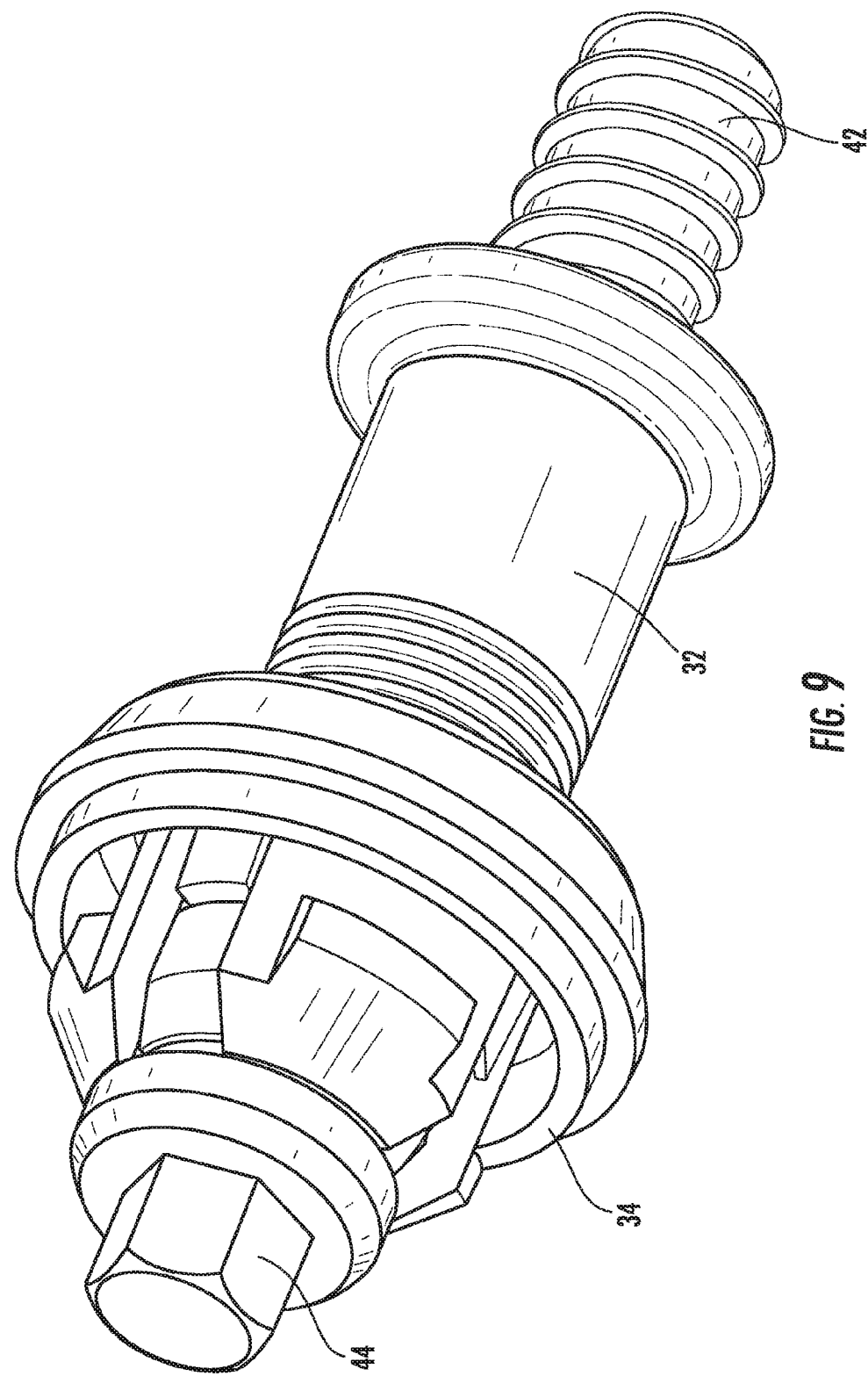
FIG. 9 is a perspective view of one embodiment of a fastener of the present invention.
Figure 26:
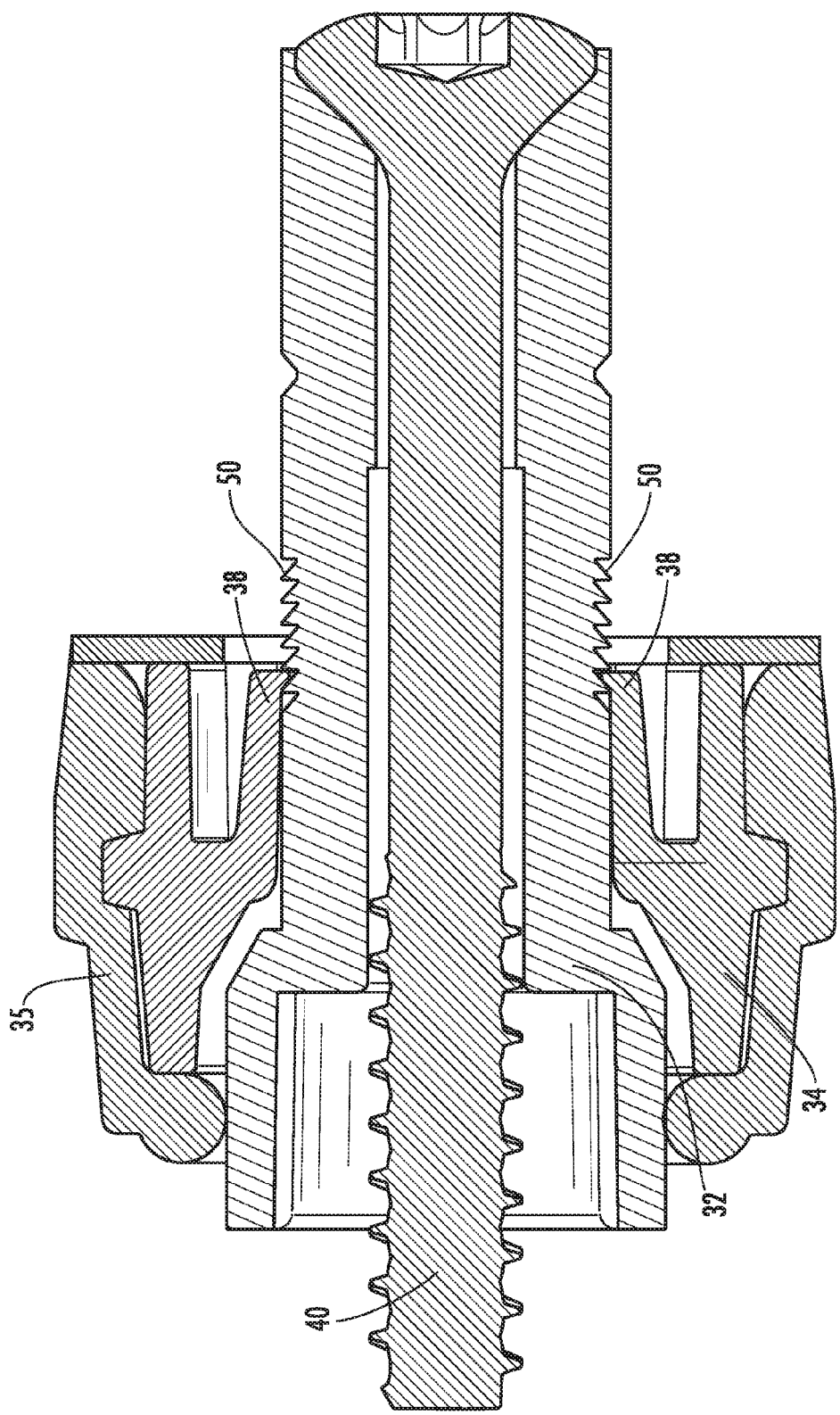
FIG. 26 is the fastener of FIG. 25, illustrating the use of a seal and showing the stud pushed through the grommet.
Figure 27:
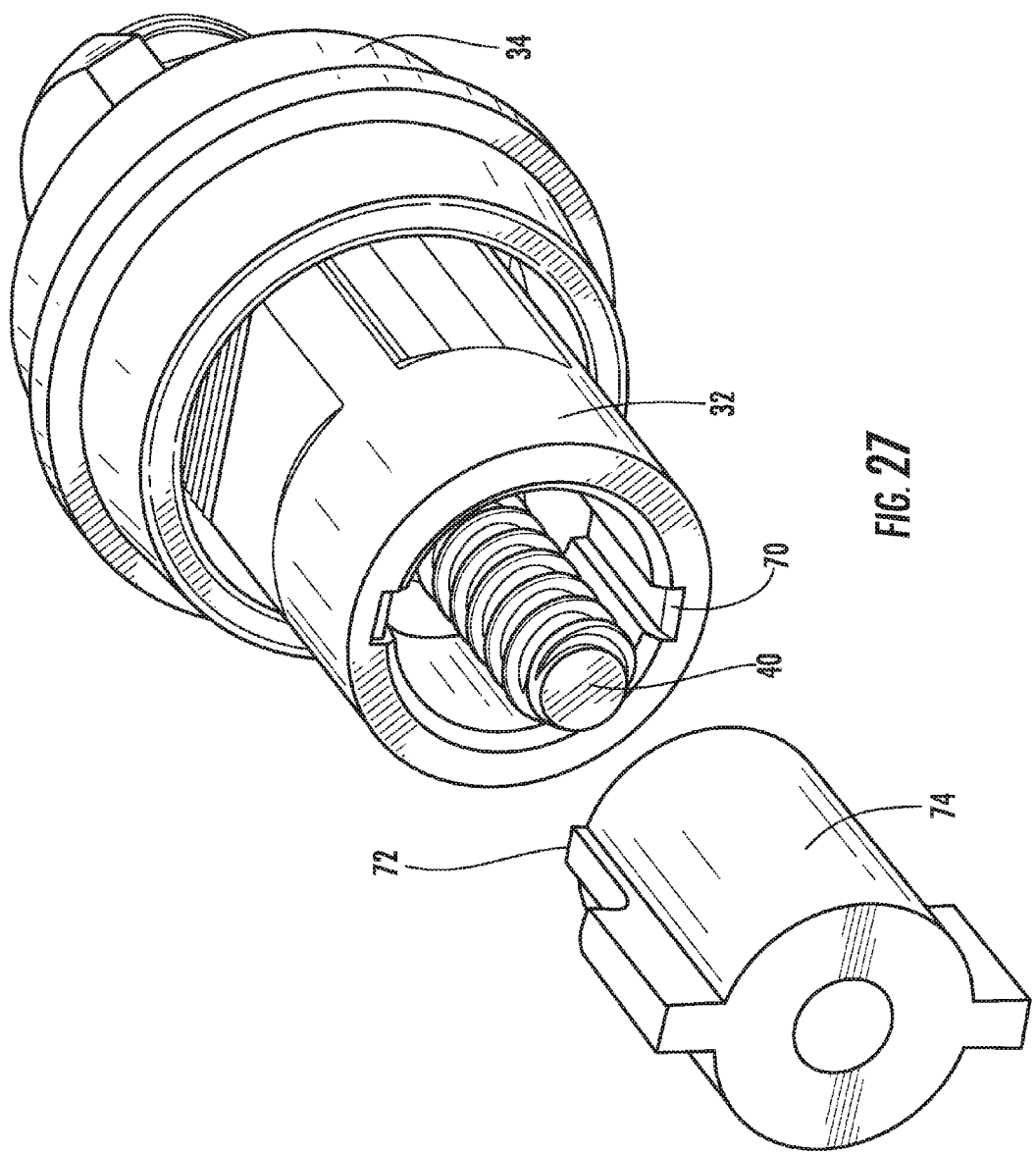
FIG. 27 is rear perspective view of the embodiment of FIG. 21, illustrating the use of an orienting slot and rib.

The tail lamp fastener 30, as shown in detail in FIGS. 6 and 6a, includes an adjustable stud 32 and a grommet 34. An optional rubber seal 35, shown in FIGS. 7, 10, 16, 25 and 26 can also be used for applications that require a better seal. The fastener 30 is pre-attached to the tail lamp 10, using any suitable method. For example, the stud 32 could have a thread segment formed thereon, as shown in FIGS. 6-7, that engages a tubular boss (not shown) on the tail lamp 10. In one preferred method, the stud 32 could be attached using a screw 40 through the center of the stud 32 as shown in FIG. 8, the embodiment of FIG. 13 and the embodiment of FIG. 21. As shown in FIG. 27, the screw 40 could thread into a boss 74 on the tail lamp 10. The stud 32 could also have a threaded portion 42 and an external hex drive portion 44 as shown in FIG. 9 for threading the stud 32 into a boss (not shown) on the tail lamp 10. The stud 32 could also be attached by snap-fit mounting over a post on the tail lamp housing, as opposed to using a screw boss and screw. The stud 32 and any portion thereof could also be integrally formed into the tail lamp 10, such as by molding all of the features of the stud 32 into the tail lamp housing. Any other suitable method of attaching the fastener 30 to or integrally forming the fastener 30 with the tail lamp 10 could also be used.

Figure 21:
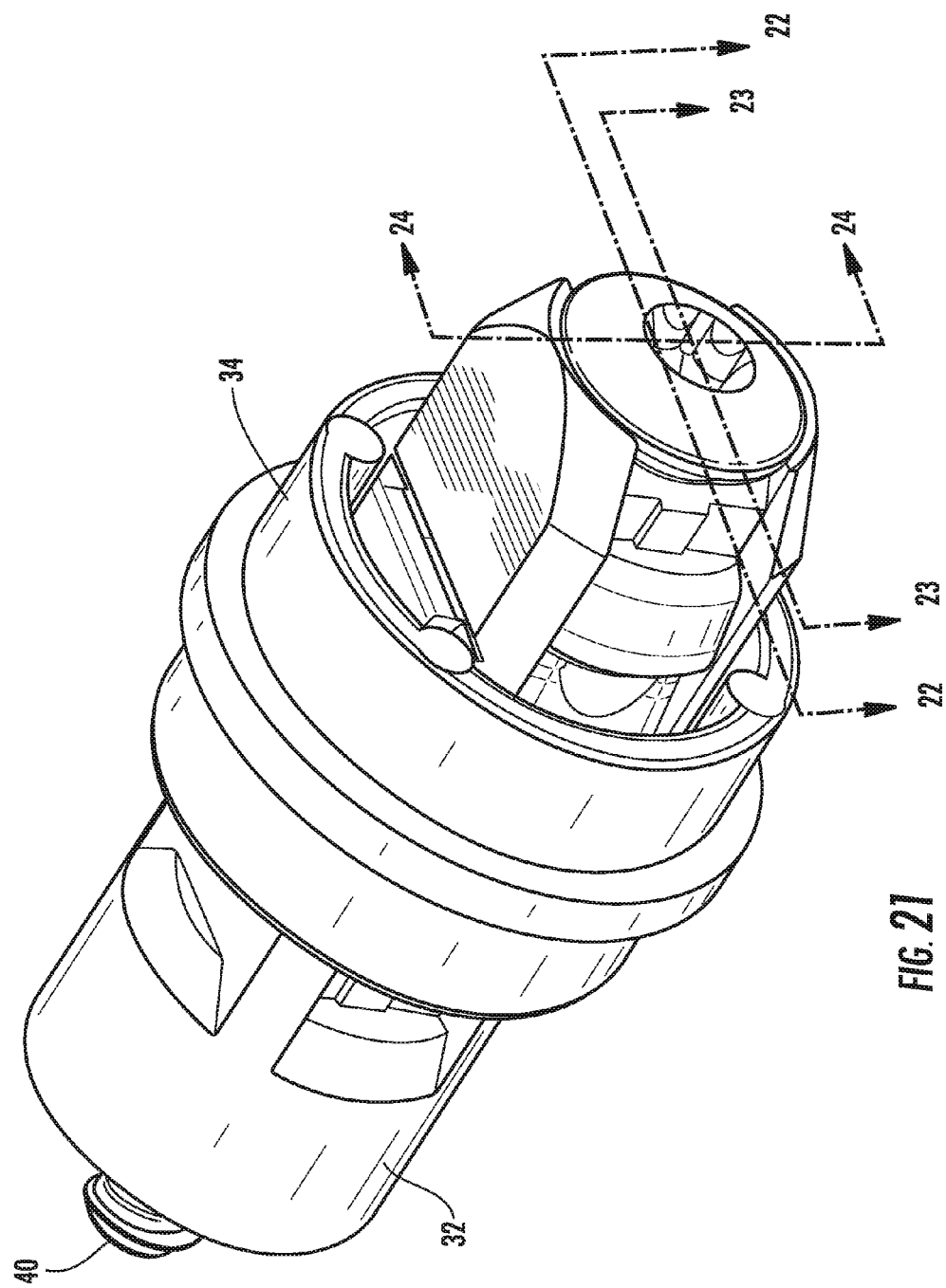
FIG. 21 is a perspective view of one embodiment of the present invention, using a stud with parallel ribs and a center column.
Figure 24:
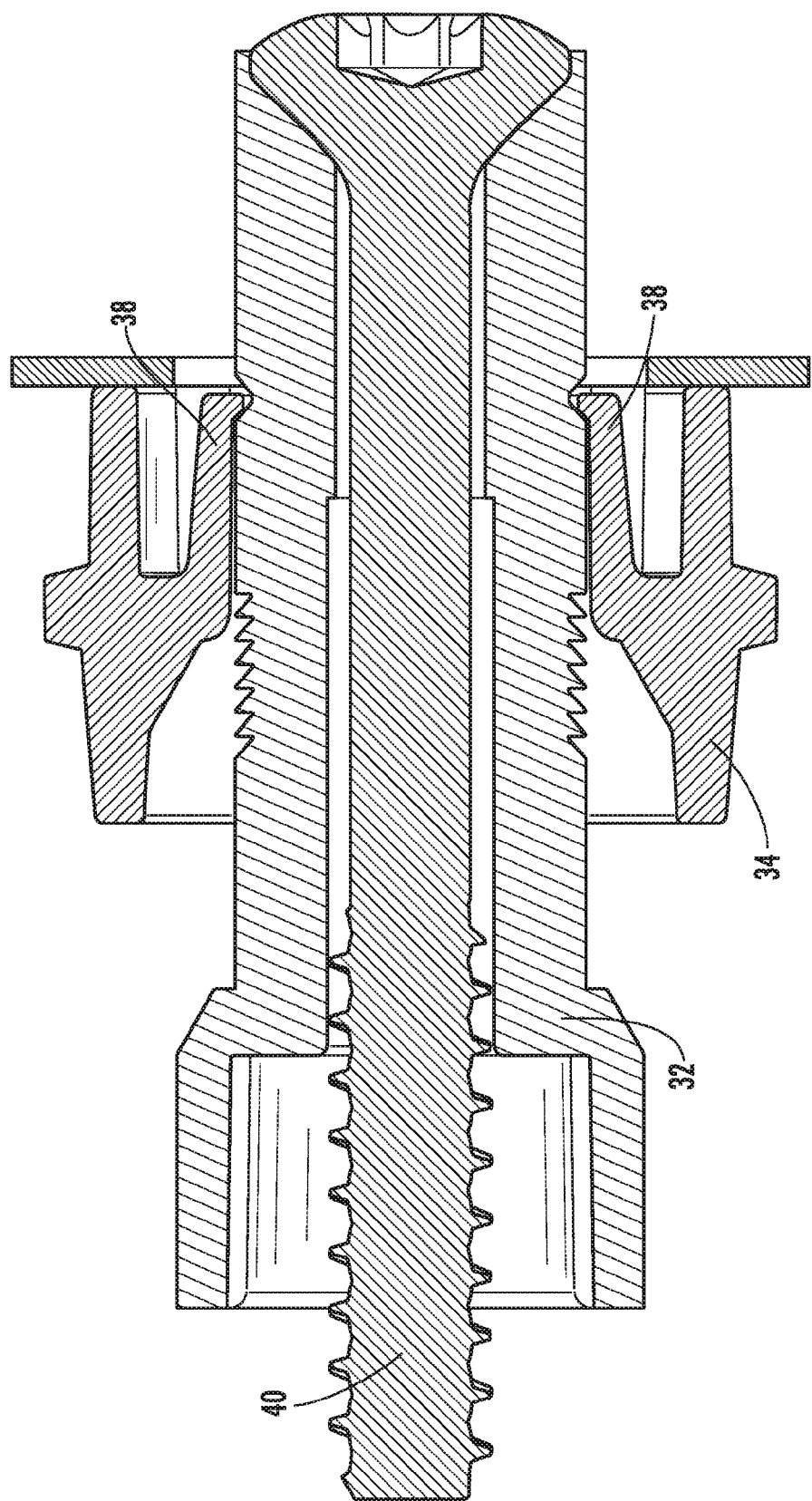
FIG. 24 is a cross-sectional view of FIG. 21, taken along plane 24-24 of FIG. 21.
Figure 25:
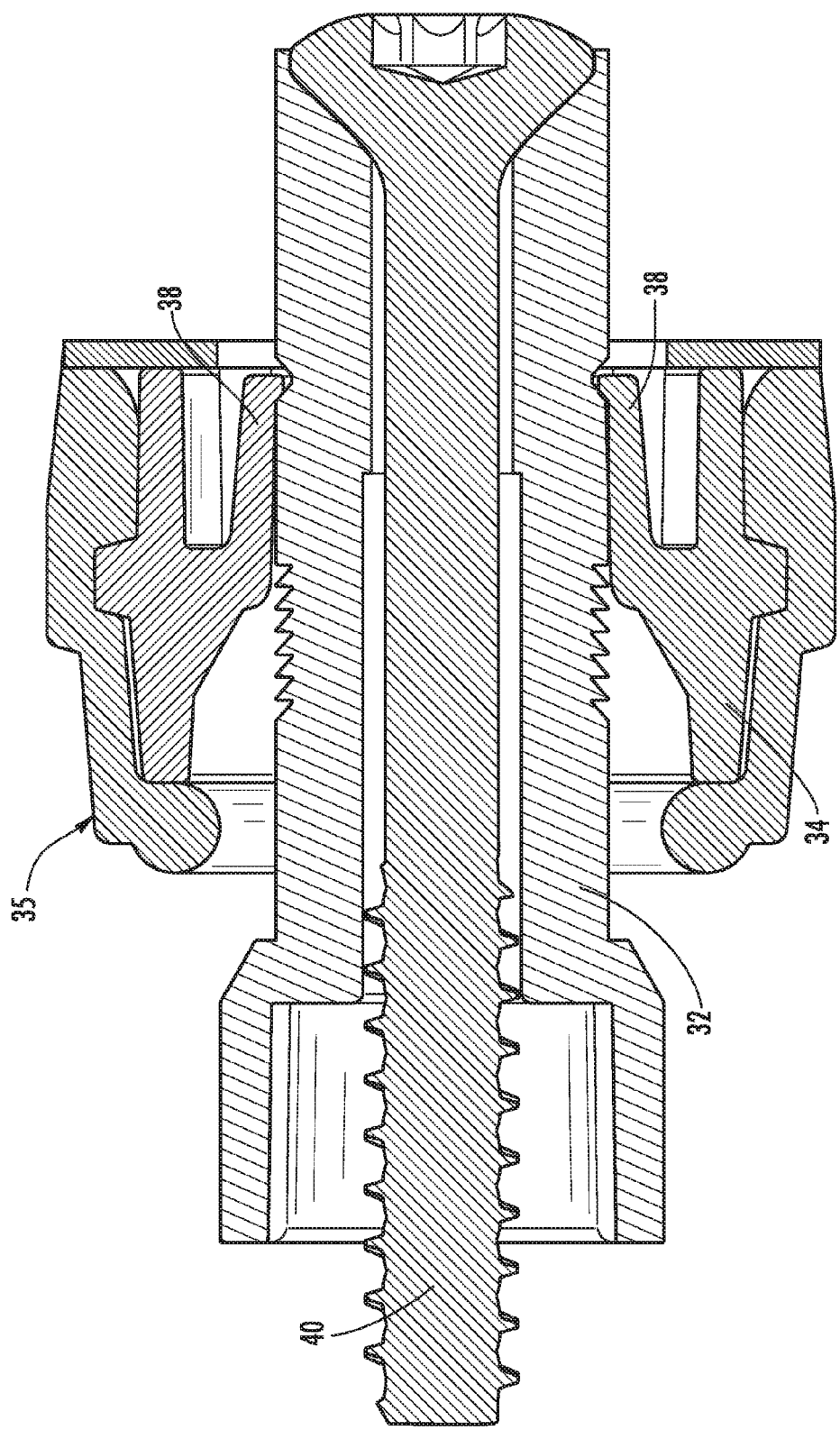
FIG. 25 is a cross-sectional view of one embodiment of the fastener of the present invention, illustrating the use of a seal and showing the stud in the initial position in the grommet.

The grommet 34 includes a bore 39, retaining fingers 36 and positioning fingers 38. The bore 39 can be either cylindrical or tapered as shown in FIG. 6a. With either a cylindrical or a tapered bore 39, the movement of the retaining and positioning fingers 36, 39 will allow some pivoting to aid in assembly and removal of the tail lamp 10, however, a tapered bore 39 will allow additional pivoting if desired for a particular application. A preferred arrangement is to mount the stud 32 to the tail lamp 10 so that the positioning fingers 38 are oriented vertically as shown in FIG. 21. Orienting can be aided using an orientation feature such as a slot 70 on the stud 32 and a rib 72 on the tail lamp 10 or boss 74, as shown in FIG. 27. The preferred arrangement then provides angular clearance for the retaining fingers 36 between the grommet 34 and the stud 32, as shown best in FIGS. 22 and 23 and provide little or no angular clearance between the grommet 34 and stud 32 for the positioning fingers 38, as best shown in FIG. 24 through FIG. 26. Tail lamp removal is eased with this arrangement, for it is natural to swing the tail lamp 10 outward to remove it after the mounting screws 18 are removed. The angular clearance allows the stud 32 to pivot freely inside the grommet 34 in this direction and this twists and hence lifts fingers 38 out of engagement with the positioning grooves 50 shown in FIG. 26. This allows the grommet to easily slide forward on the stud and aids in removal of the tail lamp 10.

Figure 10:
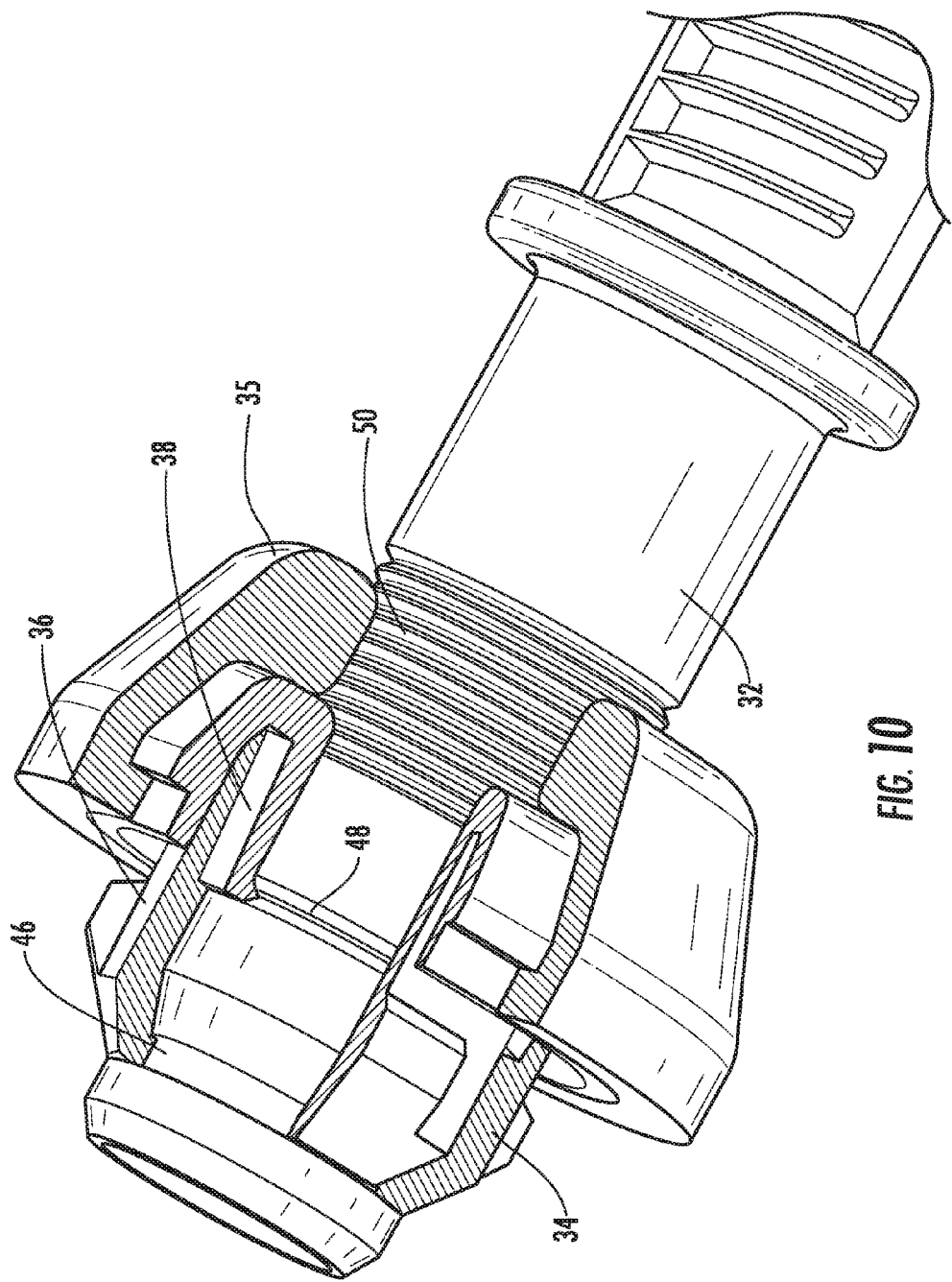
FIG. 10 is a section view of one embodiment of a fastener of the present invention.

When the grommet 34 is initially assembled in the forward position on to the stud 32, the retaining fingers 36 seat into a first retaining groove 46 on the stud 32, and the positioning fingers 38 seat into a second retaining groove 48, as best shown in FIGS. 6, 6a and 10. As the stud 32 and grommet 34 are inserted through the hole 14, as best shown in FIGS. 3-5a, the grommet 34 seats to the vehicle sheet metal 16. Once seated, the stud 34 can be pushed through the grommet 34 in a ratcheting fashion, as the positioning fingers 38 engage with positioning grooves 50 on the stud 32. As the stud 32 is pushed through, the vehicle sheet metal 16 presses against the body 52 of the grommet 34, causing the retaining fingers 36 to expand. The grommet 34 is then captivated to the sheet metal 16 as the stud 32 ratchets through the grommet 34. The stud 32 can be pushed through the grommet 34 until the tail lamp 10 is in the desired position. The retaining fingers 36 and positioning fingers 38 will then hold the tail lamp 10 in the desired position for securing with mounting screws 18, eliminating an undesirable gap between the tail lamp 10 and the vehicle sheet metal 16. A minimum, desirable gap could, however, be maintained using a variety of methods. For example, a positive stop located on a portion of the tail lamp 10, such as the lens frame, could prevent the tail lamp 10 from being pushed beyond the desired minimum gap point. If a positive stop is used, the stud 32 would be pushed through the grommet 34 until the positive stop on the tail lamp 10 contacts the sheet metal 16. Thus, the positive stop would set the minimum gap and the ratcheting stud 32 would limit the maximum gap.

Figure 17:
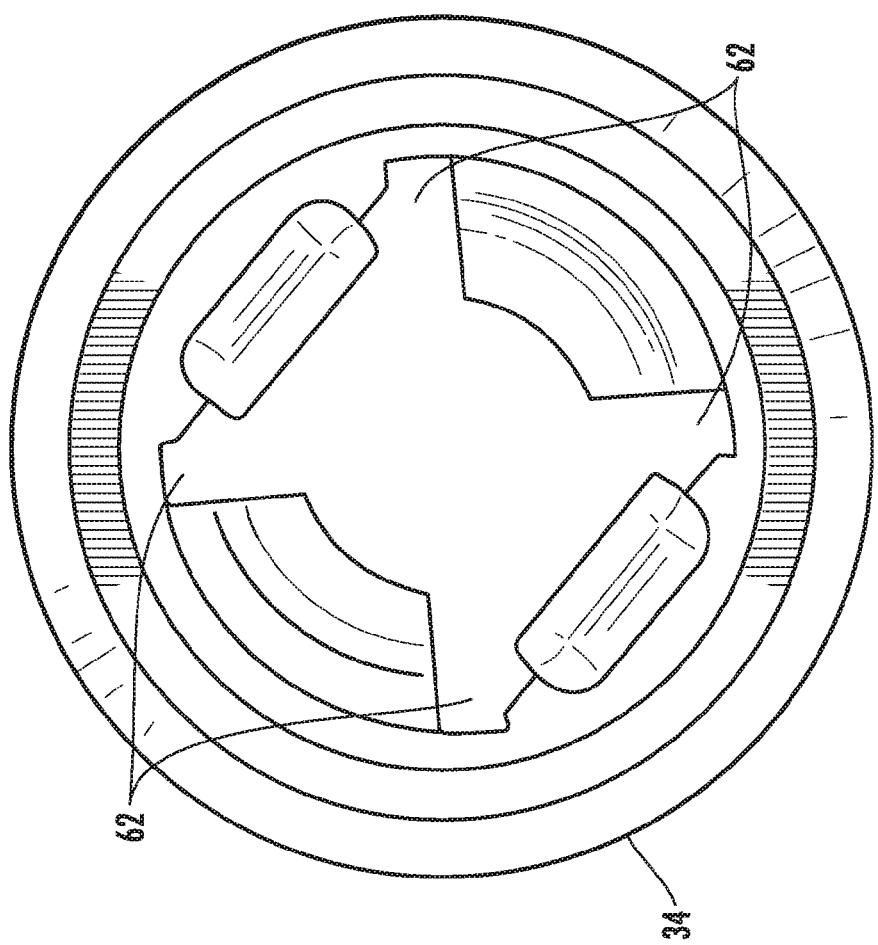
FIG. 17 is an end view of one embodiment of the grommet of the embodiment of FIG. 13.
Figure 18:
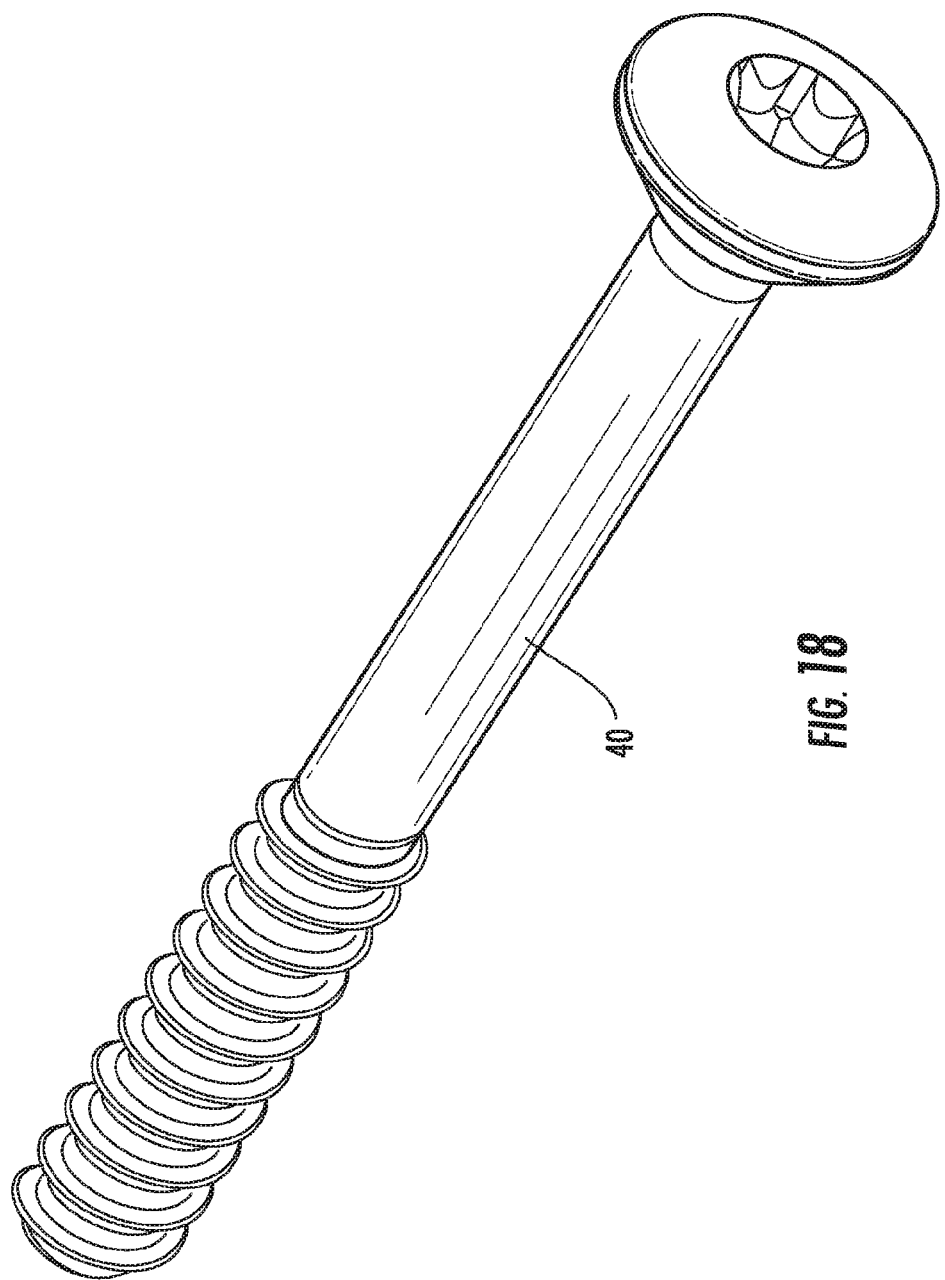
FIG. 18 is a perspective view of one embodiment of a screw of the present invention.
Figure 19:
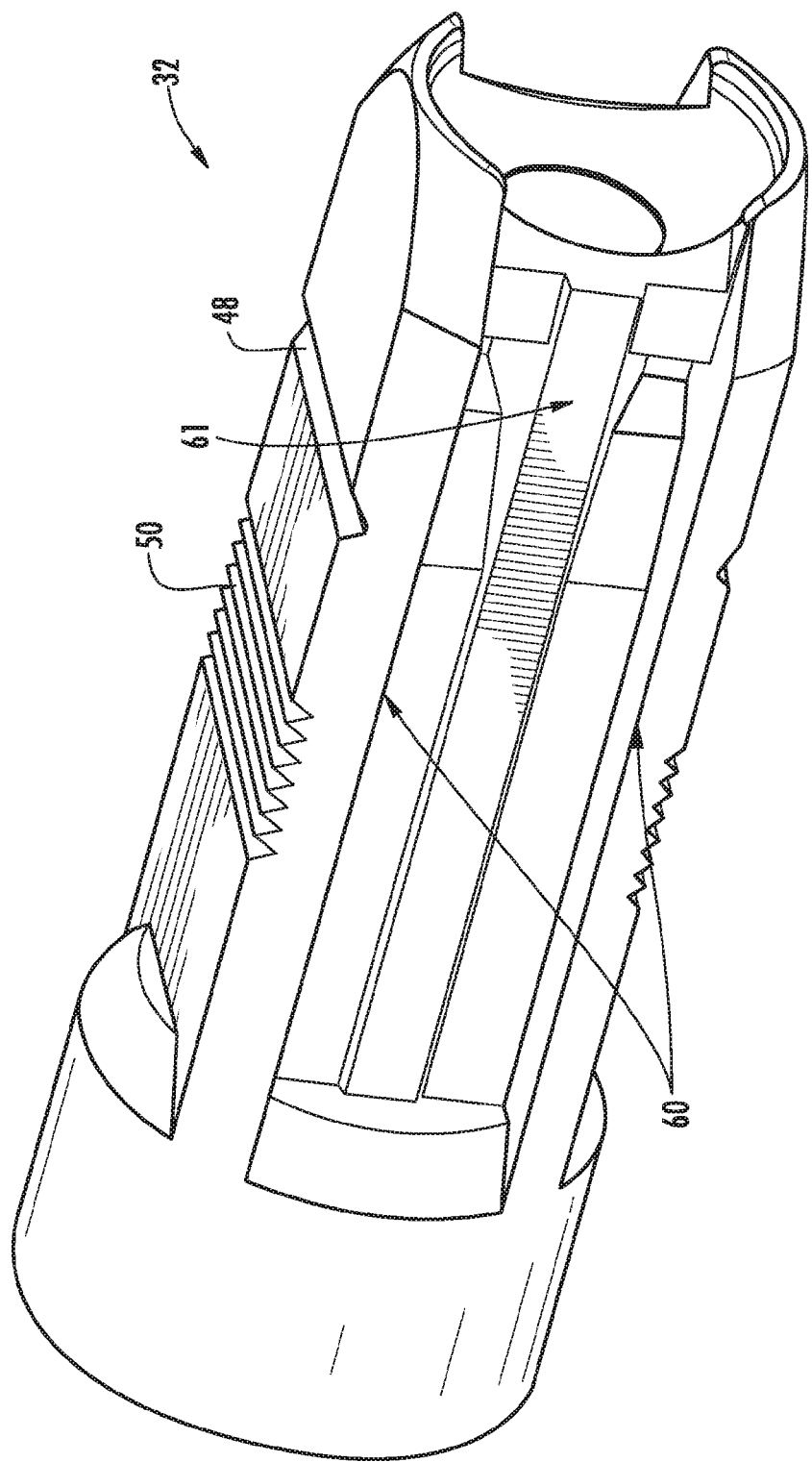
FIG. 19 is a perspective view of one embodiment of the stud of the present invention, illustrating the use of a center column between two parallel outer ribs.
Figure 20:
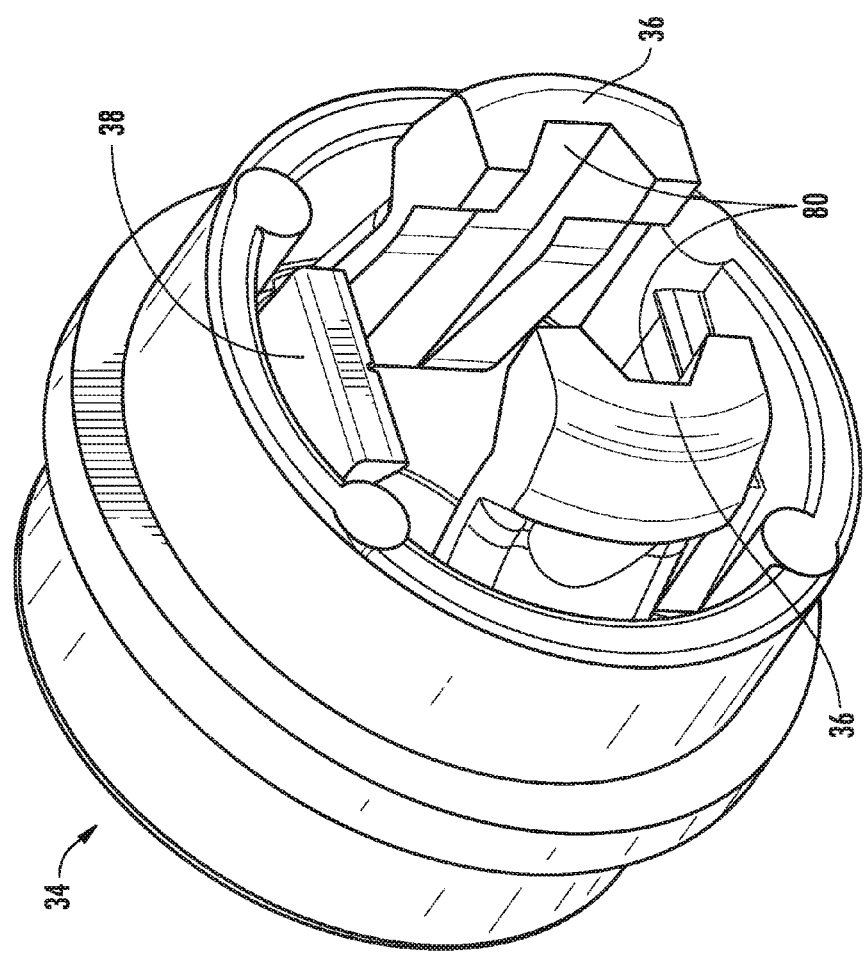
FIG. 20 is a perspective view of one embodiment of the grommet of the present invention, illustrating the clearance formed in the retaining fingers to accommodate center columns.

The stud 32 may also include a plurality of ribs 60 that run along its length as shown in FIGS. 13-16. The ribs 60 are useful to orient the fastener 30 for insertion through the hole 14. In many applications, it may be desirable to use a hole 14 that is an elongated or "double d" shape as opposed to a circular hole. In those cases, it is particularly useful to use the ribs 60, which will contact the sheet metal 16 to ensure the fastener 30 is inserted in the proper orientation by prevent the retaining fingers 36 from contacting the sheet metal 16 until the grommet 34 is fully seated to the sheet metal 16. The ribs 60 will also help support the fastener 30 and tail lamp in the hole 14 once the fastener 30 is fully engaged. As shown, the four ribs 60 are preferably positioned along the length of the stud 32 between the first and second retaining grooves 46, 48. The use of center columns 61 has also been found to be useful, and is shown in FIG. 19. The center column shown 61 in FIG. 19 is positioned along the length of the stud 32 between two parallel ribs 60. Other configurations and numbers of ribs 60 and center columns 61 could also be used. When using a stud 32 having ribs 60, the corresponding grommet 34 will also include slots 62 in the bore 39 to accept the ribs 60, as shown in FIG. 17. Likewise, when using a stud 32 having center columns 61, the corresponding grommet 34 will include clearance 80 for the center column 61 in the retaining fingers 36 as shown in FIG. 20.

The tail lamp 10 can also be detached from the vehicle sheet metal 16 without damaging the fasteners 30, simply by removing the mounting screws and pulling the fasteners 30 out of the hole 14. The removal force required will depend on the mechanical properties of the retaining and positioning fingers, and can be varied accordingly as needed for particular applications. For example, the mechanical properties of the positioning fingers 38 could be varied by the materials of manufacture and the thickness of the fingers. The tail lamp 10 can then be re-attached to the vehicle using the same fasteners 30.

Figure 11:
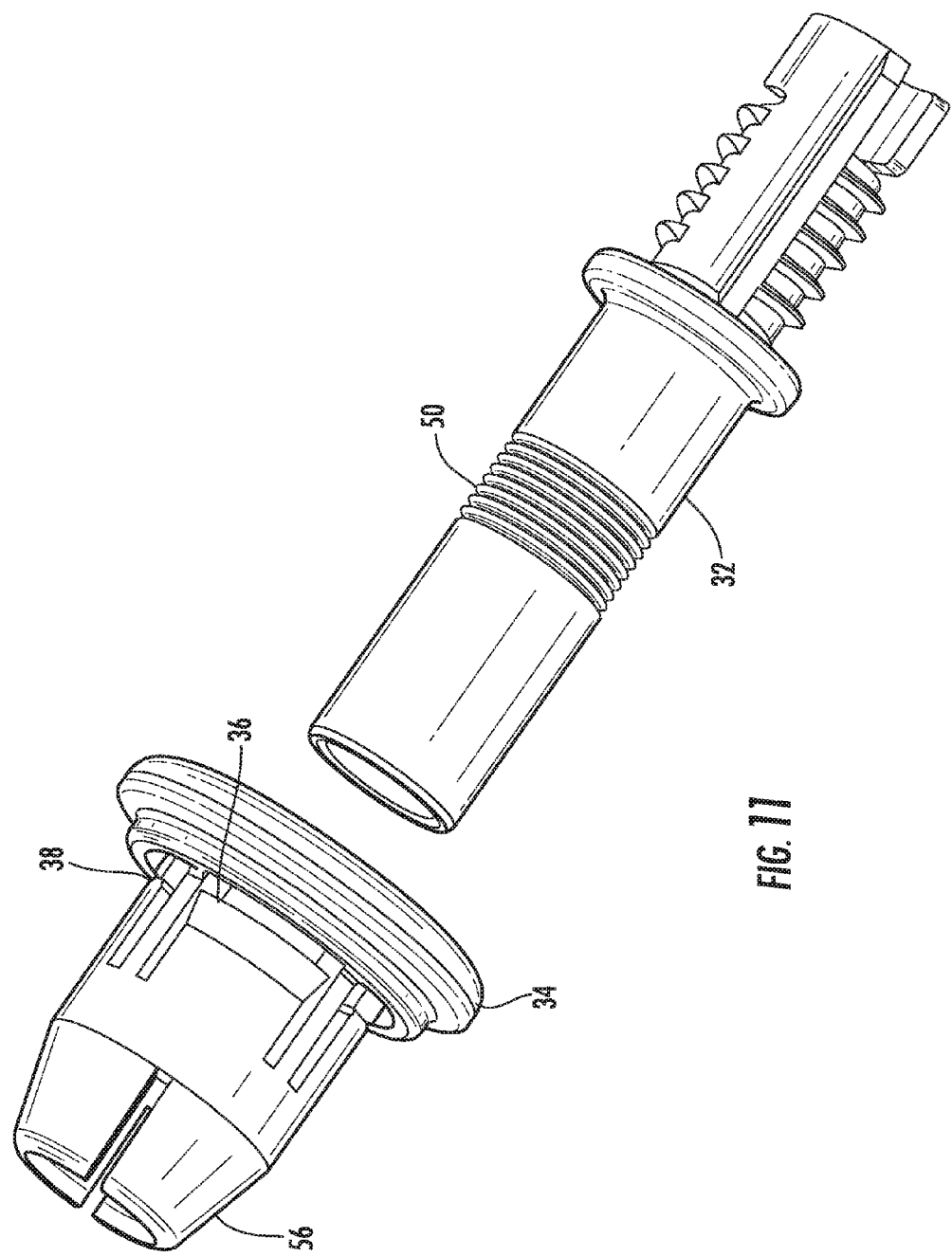
FIG. 11 is an exploded perspective view of one embodiment of a fastener of the present invention.
Figure 12:
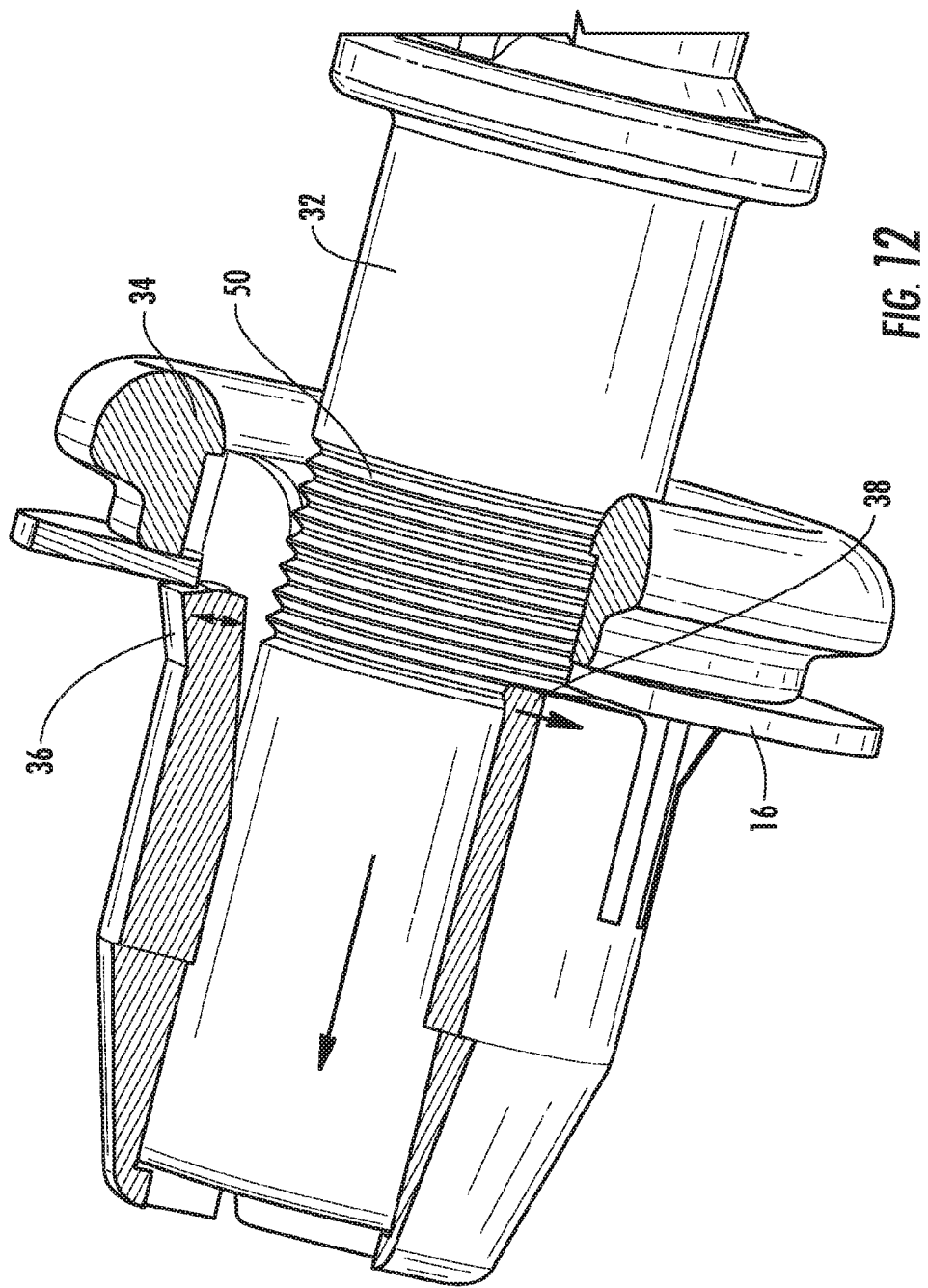
FIG. 12 is a section view of one embodiment of a fastener of the present invention.
Figure 13:
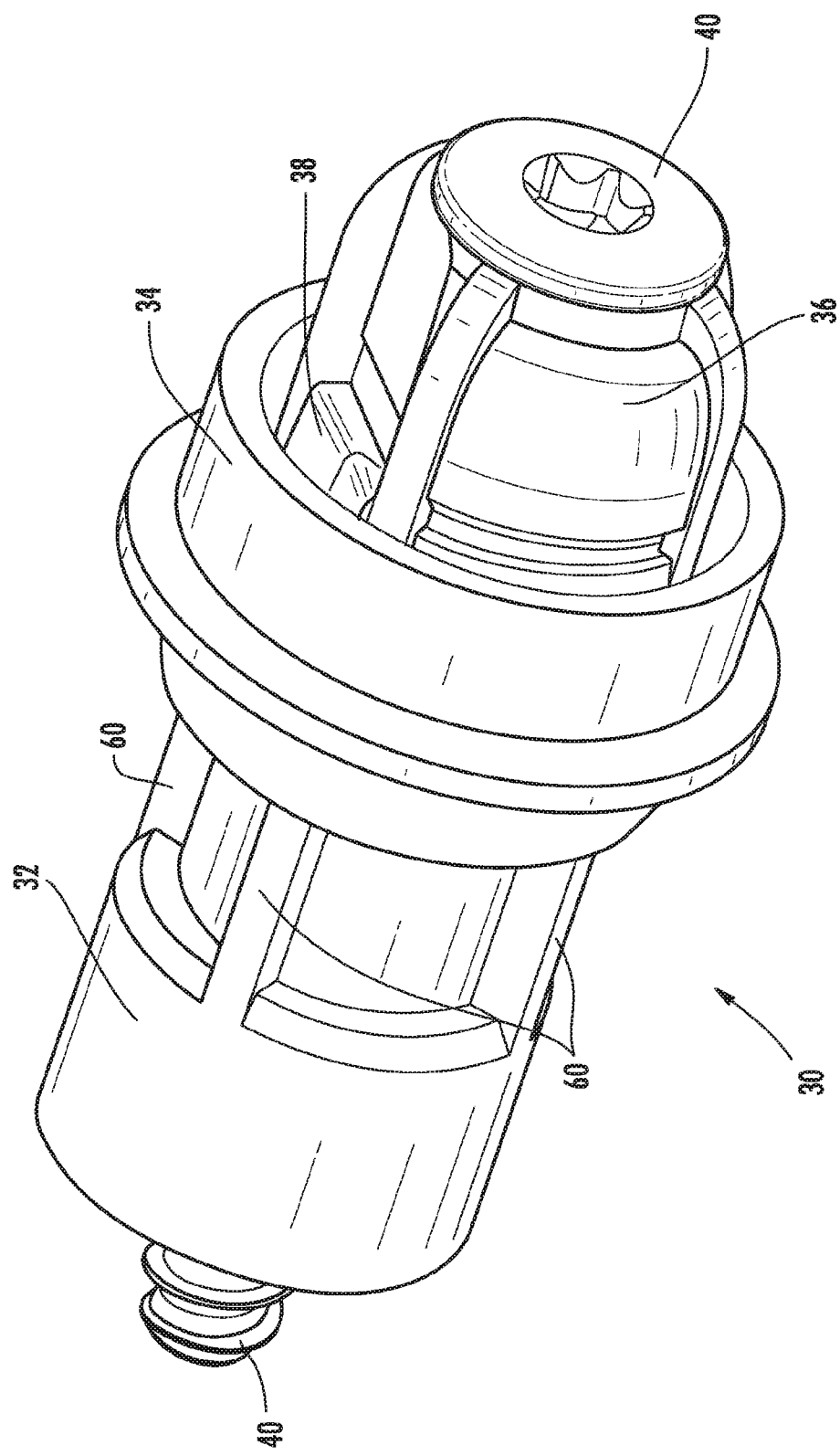
FIG. 13 is a perspective view of one embodiment of a fastener of the present invention, wherein the adjustable stud includes a plurality of ribs.
Figure 14:
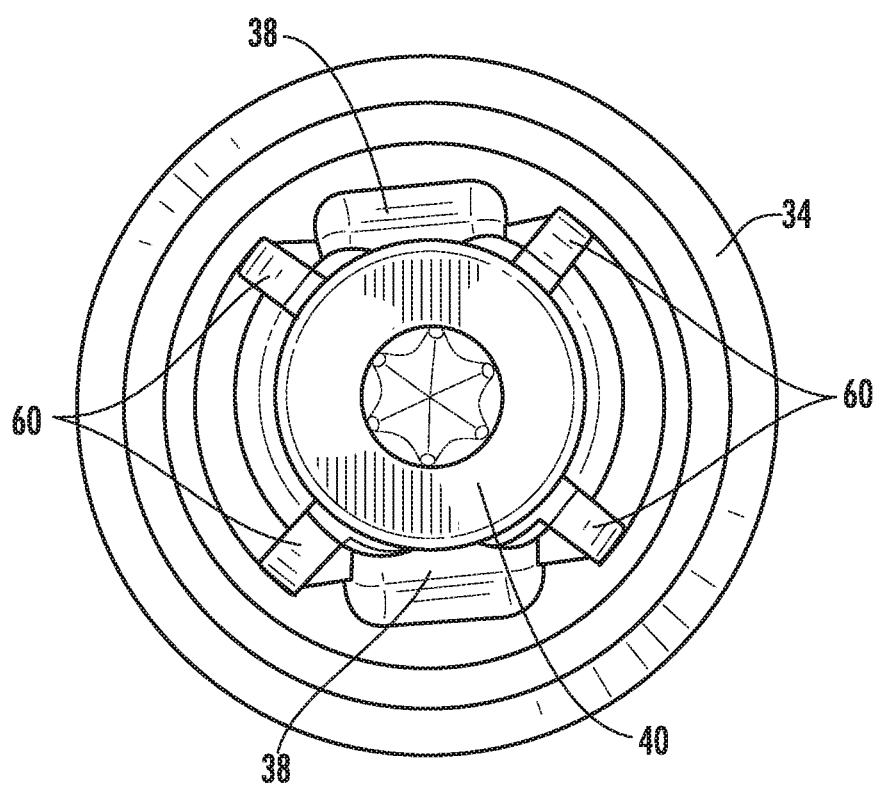
FIG. 14 is an end view of the embodiment shown in FIG. 13.
Figure 15:
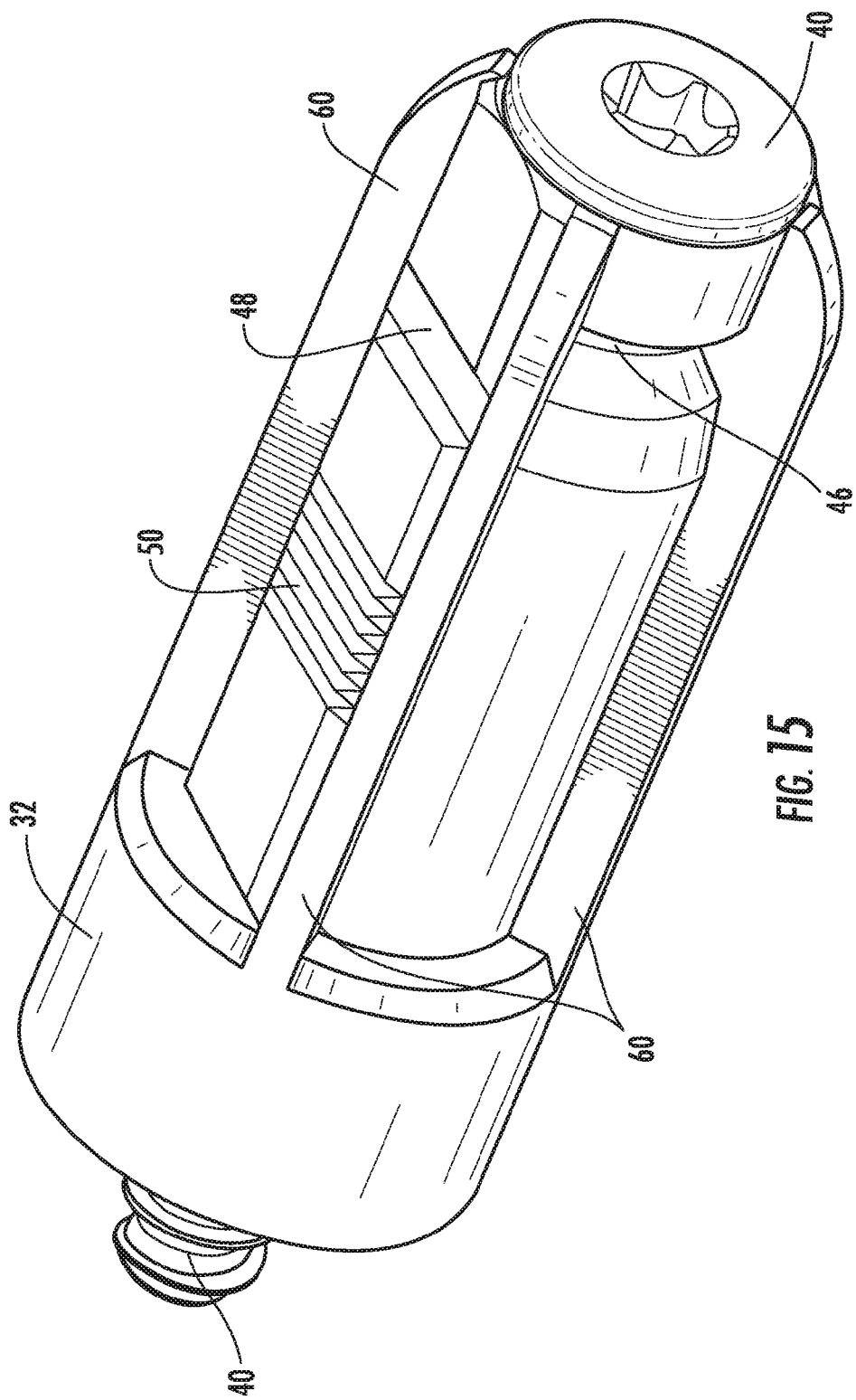
FIG. 15 is a perspective view of one embodiment of the adjustable stud of the embodiment of FIG. 13.
Figure 16:
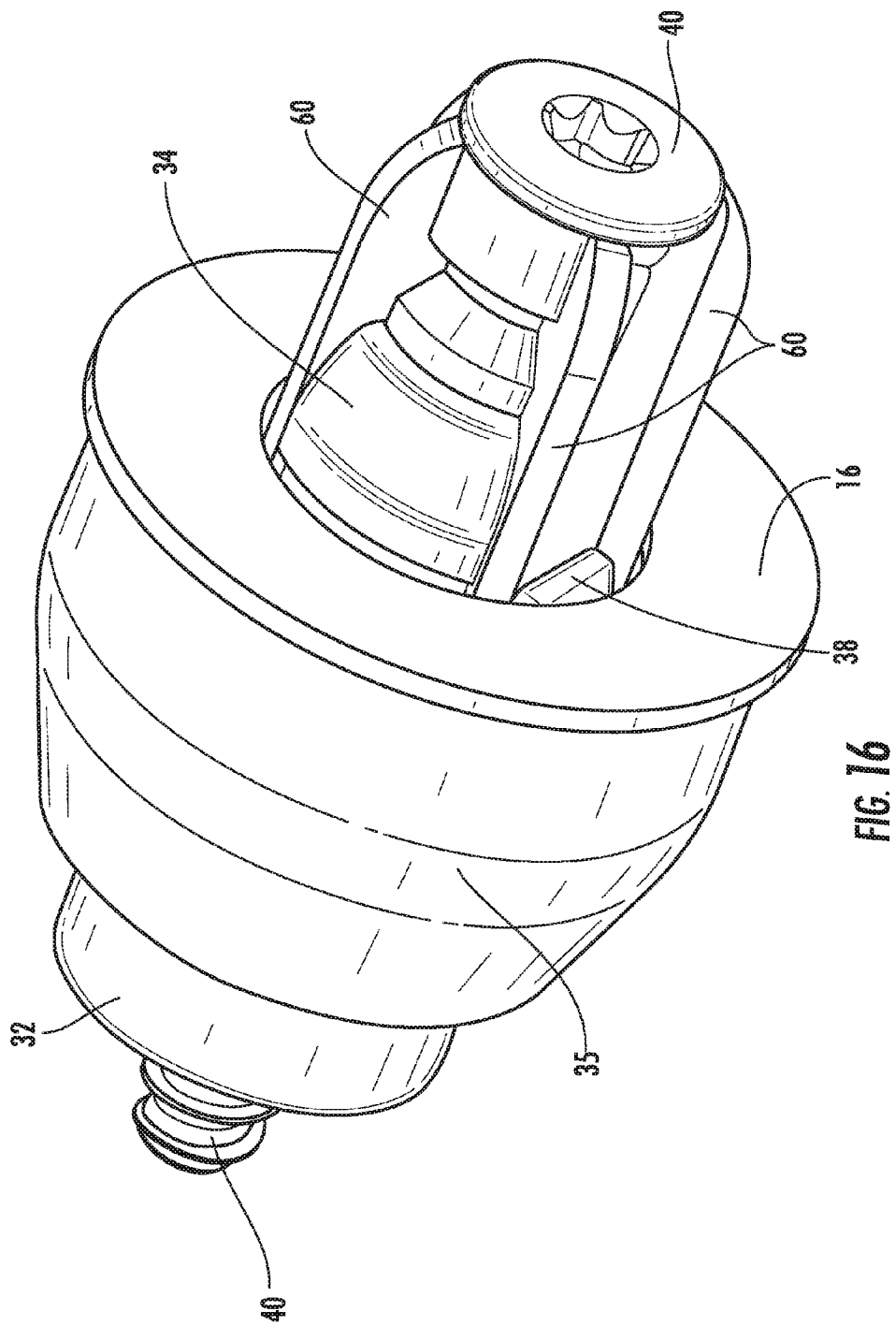
FIG. 16 is a perspective view of one embodiment of the fastener of the present invention, illustrating the use of an optional rubber seal in connection with the embodiment of FIG. 13.

Another embodiment of the present invention is shown in FIGS. 11 and 12. In this embodiment, the grommet 34 is designed to remain attached to the vehicle sheet metal 16 when the tail lamp and stud 32 are removed. The grommet shown in FIGS. 11 and 12 has a lead-in portion 56, retaining fingers 36 and positioning fingers 38. The stud 32 and grommet 34 are still placed through a hole 14 in the sheet metal 16, and the positioning fingers 38 engage the positioning grooves 50 on the stud 32 in a ratcheting fashion, as in the embodiments described above. The retaining fingers 36 are free to flex inward while on the stud so that the grommet 34 may be installed while mounted on the stud 32. The positioning fingers 38 are restricted from flexing outward during the retaining finger 36 install. Once through the hole 14 and seated in the sheet metal 16, the positioning fingers 38 may flex to position the stud 32. This helps ensure the grommet 34 is snapped into place before the stud 32 can move relative to the grommet 34 for positioning the stud 32. Unlike the embodiments of FIGS. 3-10 and 13-27, the stud 32 does not include retaining grooves 46, 48 to retain the grommet 34 on the stud 32. Instead, the retaining fingers 36 secure the grommet 34 to the sheet metal 16. The stud 32 is attached to the tail lamp 10, but is removable from the grommet 34. Thus, when the tail lamp 10 is detached from the vehicle sheet metal 16, the stud 32 is removed from the grommet 34 and the grommet 34 is retained in the sheet metal 16. The tail lamp 10 can be re-attached to the sheet metal 16 using the same stud 32 and grommet 34.

Because it is preferable to have the stud 32 and grommet 34 pre-attached to the tail lamp 10 prior to assembly, and because the positioning force and assembly force to the vehicle needs to be controlled, the grommet 34 must be prevented from moving on the stud 32 until after it is securely fastened to the sheet metal 16. When using the embodiment of the grommet 34 shown in FIGS. 3-10, the grommet 34 is pre-set detented in the forward position with collapsed retaining fingers 36 that ensure the grommet 34 is in the hole 14 and seated in the hole 14 before the stud 12 can slide through the grommet 34. When using the embodiment of the grommet 34 shown in FIGS. 11 and 12, the grommet 34 is pre-set detented in the forward position with positioning fingers 38 that are constrained until they are passed all the way through the hole 14. All of the embodiments allow independent control of the assembly forces by proper proportioning and number of fingers for retaining and positioning. The embodiments are intended to be pre-attached to the tail lamp for efficient assembly to the vehicle, and allow some degree of pivoting and flexing during assembly.

Figure 22:
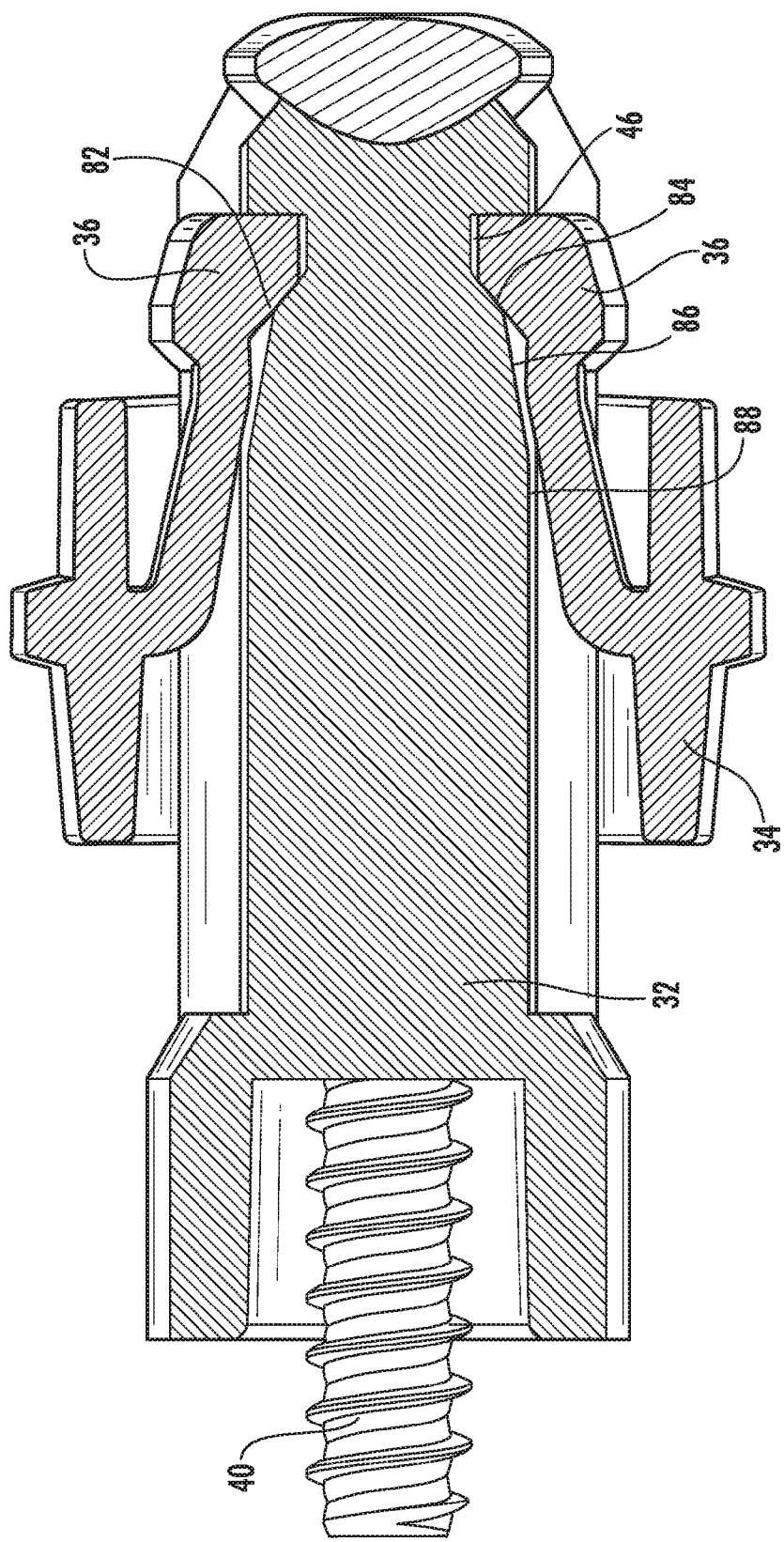
FIG. 22 is a cross-sectional view of FIG. 21, taken along plane 22-22 of FIG. 21.
Figure 23:
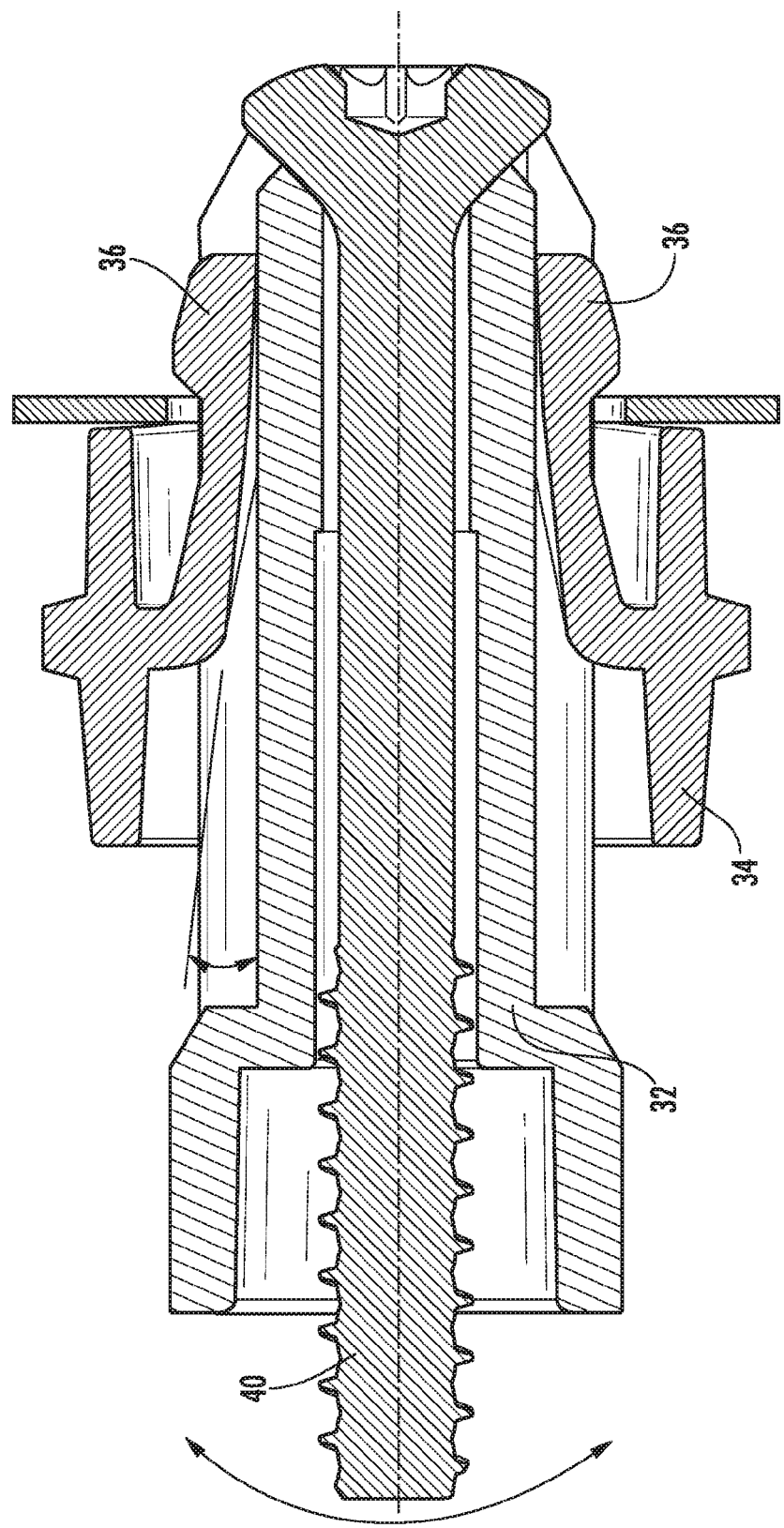
FIG. 23 is a cross-sectional view of FIG. 21, taken along plane 23-23 of FIG. 21, illustrating the use of angular clearance between the grommet and the stud.

The stud 32 and grommet 34 can also have additional design features to control the insertion forces required, while preventing the grommet 34 from becoming prematurely dislodged from the stud 32. Referring to FIG. 22, for example, the relative angles and lengths of the slope 82 of the retaining fingers 36, the ramp 84, optional second ramp 86 and final land 88 of the stud 32 can all be varied to achieve the desired force profile for control of the retaining fingers 36. The design shown in FIG. 22 has been found to be particularly advantageous for certain tail lamp applications; however, variations in design configuration may be preferable for other applications.

Many different materials can be used for the various components of the present invention, including metals, composites and plastics. It has been found cost effective to manufacture the majority of the components out of injection-molded plastic or plastic composite materials.

The fastener of the present invention may have other applications aside from use in connection with vehicle lamp assemblies. Although the invention has been herein shown and described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A fastener for a vehicle lamp assembly, the fastener comprising:
   a stud adapted for attachment to the vehicle lamp assembly;
   at least four positioning grooves disposed on the stud;
   a grommet having a body and configured to accept the stud;
   at least one retaining finger disposed on the grommet and configured to engage the stud;
   at least one positioning finger disposed on the grommet, wherein the at least one positioning finger is configured to interact with the at least four positioning grooves on the stud as the stud moves relative to the grommet,
   wherein the stud includes a first retaining groove configured to interact with the at least one retaining finger on the grommet, wherein the first retaining groove is longitudinally separated from the four positioning grooves, and
   wherein the stud includes a second retaining groove configured to interact with the at least one positioning finger on the grommet, and wherein the second retaining groove is discontinuous with the first retaining groove and the four positioning grooves.

2. The fastener of claim 1, wherein the stud includes at least one rib disposed along its length.

3. The fastener of claim 1, wherein the grommet is configured to transfer from the stud to a mounting surface on a vehicle.

4. The fastener of claim 1, wherein the grommet is configured to remain on the stud when the grommet and stud interact with a mounting surface on a vehicle.

5. A fastener for a vehicle lamp assembly, the fastener comprising:
   a stud adapted for attachment to the vehicle lamp assembly;
   at least four positioning grooves disposed on the stud;
   a grommet having a body and configured to accept the stud;
   at least one retaining finger disposed on the groin and configured to engage the stud; and
   at least one positioning finger disposed on the grommet, wherein the at least one positioning finger is configured to interact with the at least four positioning grooves on the stud as the stud moves relative to the grommet, and wherein the stud further includes a threaded portion.

6. A fastener for a vehicle lamp assembly, the fastener comprising:
   a stud adapted for attachment to the vehicle lamp assembly;
   at least two positioning grooves disposed on the stud;
   a grommet having a body and configured to accept the stud;
   at least one retaining finger disposed on the grommet;
   a first retaining groove on the stud configured to interact with the at least one retaining finger on the grommet;
   at least one positioning finger disposed on the grommet; and
   a second retaining groove on the stud configured to interact with the at least one positioning finger on the grommet,
   wherein the second retaining groove is longitudinally spaced from the a first retaining groove along the stud, and
   wherein the at least one positioning finger is configured to interact with the at least two positioning grooves on the stud as the stud moves relative to the grommet.

* * * * *

UNITED STATES PATENT AND TRADEMARK OFFICE
CERTIFICATE OF CORRECTION

PATENT NO. : 9,938,999 B2  
APPLICATION NO. : 15/045782  
DATED : April 10, 2018  
INVENTOR(S) : Burton Page 1 of 1

It is certified that error appears in the above-identified patent and that said Letters Patent is hereby corrected as shown below:

In the Claims

Column 8
Line 6, the word --grommet-- should replace the word "groin"

Signed and Sealed this
Twenty-fourth Day of July, 2018

Andrei Iancu
*Director of the United States Patent and Trademark Office*